United States Patent
Li et al.

(10) Patent No.: US 9,374,567 B2
(45) Date of Patent: Jun. 21, 2016

(54) IMAGE PROCESSING METHOD AND APPARATUS, AND IMAGING DEVICE

(71) Applicant: Huawei Technologies Co., Ltd., Shenzhen, Guangdong (CN)

(72) Inventors: Shuiping Li, Shenzhen (CN); Hai Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/719,590

(22) Filed: May 22, 2015

(65) Prior Publication Data

US 2015/0256805 A1    Sep. 10, 2015

Related U.S. Application Data

(63) Continuation of application No. PCT/CN2013/073878, filed on Apr. 8, 2013.

(30) Foreign Application Priority Data

Nov. 22, 2012 (CN) .......................... 2012 1 0478852

(51) Int. Cl.
  *H04N 9/64* (2006.01)
  *H04N 9/04* (2006.01)
  *G06T 7/40* (2006.01)
  *G06T 3/40* (2006.01)

(52) U.S. Cl.
  CPC .............. *H04N 9/646* (2013.01); *G06T 3/4015* (2013.01); *G06T 7/408* (2013.01); *H04N 9/045* (2013.01); *G06T 2207/10024* (2013.01); *G06T 2207/20172* (2013.01)

(58) Field of Classification Search
  None
  See application file for complete search history.

(56) References Cited

U.S. PATENT DOCUMENTS

| | | | |
|---|---|---|---|
| 6,853,748 | B2 | 2/2005 | Endo et al. |
| 2009/0066821 | A1 | 3/2009 | Achong et al. |
| 2011/0141130 | A1 | 6/2011 | Yagiura |
| 2012/0293696 | A1 | 11/2012 | Tanaka |

FOREIGN PATENT DOCUMENTS

| | | |
|---|---|---|
| CN | 101197916 A | 6/2008 |
| CN | 101511031 A | 8/2009 |
| CN | 102055917 A | 5/2011 |
| CN | 102254301 A | 11/2011 |
| CN | 102938843 A | 2/2013 |
| WO | WO 2012/117584 A1 | 9/2012 |

*Primary Examiner* — Twyler Haskins
*Assistant Examiner* — Angel L Garces-Rivera

(57) ABSTRACT

An image processing method and apparatus, and an imaging device are provided. The method includes: obtaining a first green component value and a first red component value or first blue component value that are of the current pixel and obtained by using an interpolation algorithm, a minimum first-gradient value in horizontal and vertical directions, a minimum second-gradient value in inclined directions, a threshold for a green component, and a threshold for a red component or blue component; obtaining a corrected value of the green component and a corrected value of the red component or blue component of the current pixel; and obtaining a second green component value and a second red component value or second blue component value of the current pixel. The method may be used to reduce crosstalk of a color component in which the current pixel is located on other two color components obtained by interpolation.

19 Claims, 9 Drawing Sheets

IMAGE PROCESSING METHOD AND APPARATUS, AND IMAGING DEVICE

CROSS-REFERENCE TO RELATED APPLICATIONS

This application is a continuation of International Application No. PCT/CN2013/073878, filed on Apr. 8, 2013, which claims priority to Chinese Patent Application No. 201210478852.2, filed on Nov. 22, 2012, both of which are hereby incorporated by reference in their entireties.

TECHNICAL FIELD

The present invention relates to the field of image processing technologies, and in particular, to an image processing method and apparatus, and an imaging device.

BACKGROUND

When obtaining each pixel of a raw image, a light-sensitive chip of a camera can obtain only a value of one color component of three color components red, green, and blue (R/G/B) of each pixel. In order to obtain a bitmap (BMP) image, values of the other two color components of the pixel need to be obtained by estimation by using a correlation between three color components of a current pixel and surrounding pixels in the RAW image. A similar operation may be performed on each pixel in the RAW image to obtain a complete color BMP image. This process is referred to as interpolation or demosaicing.

A simplest algorithm used in the foregoing process is a bi-linear interpolation algorithm, where processing is performed on R, G, and B separately without considering a correlation between the three. A complex interpolation algorithm takes advantage of a correlation between the three, R, G, and B, and takes different directions into consideration. In a long-term process of research and development, the inventor of the present application finds that fluctuation, in an adjacent domain, of a color component in which a current pixel is located is transferred to other two color components obtained by interpolation, thereby resulting in crosstalk of an incorrect color.

SUMMARY

A main technical problem to be resolved by the present invention is to provide an image processing method and apparatus, and an imaging device, which can reduce crosstalk of a color component in which a current pixel is located on other two color components obtained by interpolation.

According to one aspect of the present invention, an image processing method is provided and includes: obtaining a first result of a current pixel, where the first result of the current pixel includes: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel; obtaining a second result of the current pixel according to the first result of the current pixel, where the second result of the current pixel includes a corrected value of the green component and a corrected value of the red component or blue component of the current pixel; and obtaining a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

The step of obtaining a second result of the current pixel according to the first result of the current pixel includes that: if the minimum first-gradient value is less than or equal to the minimum second-gradient value, the corrected value of the green component of the current pixel equals a first difference; when a color component of the current pixel is a blue component, the corrected value of the red component of the current pixel equals one of the first difference and a second difference; and when the color component of the current pixel is a red component, the corrected value of the blue component of the current pixel equals one of the first difference and a third difference; or if the minimum first-gradient value is greater than the minimum second-gradient value, and when a color component of the current pixel is a blue component, the corrected value of the green component of the current pixel equals one of a first difference and a second difference, and the corrected value of the red component of the current pixel equals the second difference; and when the color component of the current pixel is a red component, the corrected value of the green component of the current pixel equals one of the first difference and a third difference, and the corrected value of the blue component of the current pixel equals the third difference, where a difference between the first green component value of the current pixel and the threshold for the green component of the current pixel is the first difference; when the color component of the current pixel is a blue component, a difference between the first red component value of the current pixel and the threshold for the red component of the current pixel is the second difference; and when the color component of the current pixel is a red component, a difference between the first blue component value of the current pixel and the threshold for the blue component of the current pixel is the third difference.

A step in which the corrected value of the red component of the current pixel equals one of the first difference and a second difference includes that: the corrected value of the red component of the current pixel equals a minimum difference of the first difference and the second difference.

A step in which the corrected value of the blue component of the current pixel equals one of the first difference and a third difference includes that: the corrected value of the blue component of the current pixel equals a minimum difference of the first difference and the third difference.

A step in which the corrected value of the green component of the current pixel equals one of a first difference and a second difference includes that: the corrected value of the green component of the current pixel equals a minimum difference of the first difference and the second difference.

A step in which the corrected value of the green component of the current pixel equals one of the first difference and a third difference includes that: the corrected value of the green component of the current pixel equals a minimum difference of the first difference and the third difference.

The step of obtaining the minimum first-gradient value of the current pixel in the horizontal and vertical directions and the minimum second-gradient value of the current pixel in the inclined directions includes: in a 3×3 window using the current pixel as a center, obtaining gradients of the current pixel in the horizontal direction, the vertical direction, a 45-degree inclined direction, and a 135-degree inclined direction; and obtaining a minimum value of the gradients of the current pixel in the horizontal direction and the vertical direction, where the obtained minimum value of the gradients in the horizontal direction and the vertical direction is the minimum first-gradient value of the current pixel in the horizontal and vertical directions; and obtaining a minimum value of the gradients of the current pixel in the 45-degree inclined direction and the 135-degree inclined direction, where the obtained minimum value of the gradients in the 45-degree inclined direction and the 135-degree inclined direction is the minimum second-gradient value of the current pixel in the inclined directions.

The step of obtaining gradients of the current pixel in the horizontal direction, the vertical direction, a 45-degree inclined direction, and a 135-degree inclined direction includes: obtaining an absolute value of performing subtraction between values of a same color component of the current pixel in one direction, where the one direction is any one direction of the horizontal direction, the vertical direction, the 45-degree inclined direction, and the 135-degree inclined direction; and performing summation of all absolute values of performing subtraction between the values of the same color component of the current pixel in one direction, where a result of the summation is the gradient of the current pixel in the one direction, so that the gradients of the current pixel in the horizontal direction, the vertical direction, the 45-degree inclined direction, and the 135-degree inclined direction may be obtained according to this method.

The step of obtaining the threshold for the green component of the current pixel, and the threshold for the red component or blue component of the current pixel includes: in a 3×3 window using the current pixel as a center, separately sorting four green component values and four red component values or four blue component values of pixels adjacent to the current pixel by size; and obtaining a first weighted average value and a fourth weighted average value or seventh weighted average value of the green component and the red component or blue component, respectively, after the sorting, where the first weighted average value and the fourth weighted average value or seventh weighted average value are the threshold for the green component of the current pixel and the threshold for the red component or blue component of the current pixel, respectively.

After the step of sorting, in a 3×3 window using the current pixel as a center, four green component values of pixels adjacent to the current pixel by size, the method further includes: obtaining a second weighted average value and a third weighted average value of the green component after the sorting, where the second weighted average value is greater than the third weighted average value, and the second weighted average value and the third weighted average value are a maximum threshold and a minimum threshold of the threshold for the green component of the current pixel, respectively.

After the step of sorting, in a 3×3 window using the current pixel as a center, four red component values or four blue component values of pixels adjacent to the current pixel by size, the method further includes: when a color component of the current pixel is a blue component, obtaining a fifth weighted average value and a sixth weighted average value of the red component after the sorting, where the fifth weighted average value is greater than the sixth weighted average value, and the fifth weighted average value and the sixth weighted average value are a maximum threshold and a minimum threshold of the threshold for the red component of the current pixel, respectively; and when the color component of the current pixel is a red component, obtaining an eighth weighted average value and a ninth weighted average value of the blue component after the sorting, where the eighth weighted average value is greater than the ninth weighted average value, and the eighth weighted average value and the ninth weighted average value are a maximum threshold and a minimum threshold of the threshold for the blue component of the current pixel, respectively.

When the first green component value, the first red component value, or the first blue component value of the current pixel is less than the minimum threshold for the green component, the red component, or the blue component of the current pixel, respectively, the first difference, the second difference, or the third difference is a difference between the first green component value, the first red component value, or the first blue component value of the current pixel and the minimum threshold for the green component, the red component, or the blue component of the current pixel, respectively; when the first green component value, the first red component value, or the first blue component value of the current pixel is greater than the maximum threshold for the green component, the red component, or the blue component of the current pixel, respectively, the first difference, the second difference, or the third difference is a difference between the first green component value, the first red component value, or the first blue component value of the current pixel and the maximum threshold for the green component, the red component, or the blue component of the current pixel, respectively; and when the first green component value, the first red component value, or the first blue component value of the current pixel is greater than or equal to the minimum threshold for the green component, the red component, or the blue component of the current pixel, respectively, and is less than or equal to the maximum threshold for the green component, the red component, or the blue component of the current pixel, respectively, the first difference, the second difference, or the third difference is 0.

According to another aspect of the present invention, an image processing apparatus is provided and includes a first obtaining module, a second obtaining module, and a third obtaining module. The first obtaining module is configured to obtain a first result of a current pixel, where the first result of the current pixel includes: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel; and the first obtaining module sends the obtained first result of the current pixel to the second obtaining module and the third obtaining module. The second obtaining module is configured to receive the first result of the current pixel sent by the first obtaining module, and obtain a second result of the current pixel according to the first result of the current pixel, where the second result of the current pixel includes a corrected value of the green component and a corrected value of the red component or blue component of the current pixel; and the second obtaining module sends the obtained second result of the current pixel to the third obtaining module. The third obtaining module is configured to receive the first result and the second result of the current pixel that are sent by the first obtaining module and the second obtaining module, respectively, and obtain a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

The second obtaining module includes a first corrected-value determining unit and a second corrected-value determining unit. The first corrected-value determining unit is configured to receive the first result of the current pixel sent by the first obtaining module, where when the minimum first-gradient value is less than or equal to the minimum second-gradient value, the corrected value of the green component of the current pixel equals a first difference; when a color component of the current pixel is a blue component, the corrected value of the red component of the current pixel equals one of the first difference and a second difference, and when the color component of the current pixel is a red component, the corrected value of the blue component of the current pixel equals one of the first difference and a third difference. The second corrected-value determining unit is configured to receive the first result of the current pixel sent by the first obtaining module, where when the minimum first-gradient value is greater than the minimum second-gradient value, and when the color component of the current pixel is a blue component, the corrected value of the green component of the current pixel equals one of the first difference and the second difference, and the corrected value of the red component of the current pixel equals the second difference; and when the color component of the current pixel is a red component, the corrected value of the green component of the current pixel equals one of the first difference and the third difference, and the corrected value of the blue component of the current pixel equals the third difference, where a difference between the first green component value of the current pixel and the threshold for the green component of the current pixel is the first difference; when the color component of the current pixel is a blue component, a difference between the first red component value of the current pixel and the threshold for the red component of the current pixel is the second difference; and when the color component of the current pixel is a red component, a difference between the first blue component value of the current pixel and the threshold for the blue component of the current pixel is the third difference.

The first corrected-value determining unit is specifically configured to, when the color component of the current pixel is a blue component, enable the corrected value of the red component of the current pixel to equal a minimum difference of the first difference and the second difference, and when the color component of the current pixel is a red component, enable the corrected value of the blue component of the current pixel to equal a minimum difference of the first difference and the third difference.

The second corrected-value determining unit is specifically configured to, when the color component of the current pixel is a blue component, enable the corrected value of the green component of the current pixel to equal a minimum difference of the first difference and the second difference, and when the color component of the current pixel is a red component, enable the corrected value of the green component of the current pixel to equal a minimum difference of the first difference and the third difference.

The first obtaining module includes a first obtaining unit and a second obtaining unit. The first obtaining unit is configured to, in a 3×3 window using the current pixel as a center, obtain gradients of the current pixel in the horizontal direction, the vertical direction, the 45-degree inclined direction, and the 135-degree inclined direction, and send the gradients of the current pixel in the horizontal direction, the vertical direction, a 45-degree inclined direction, and a 135-degree inclined direction to the second obtaining unit. The second obtaining unit is configured to receive the gradients, which are sent by the first obtaining unit, of the current pixel in the horizontal direction, the vertical direction, the 45-degree inclined direction, and the 135-degree inclined direction; obtain a minimum value of the gradients of the current pixel in the horizontal direction and the vertical direction, where the obtained minimum value of the gradients in the horizontal direction and the vertical direction is the minimum first-gradient value of the current pixel in the horizontal and vertical directions; and obtain a minimum value of the gradients of the current pixel in the 45-degree inclined direction and the 135-degree inclined direction, where the obtained minimum value of the gradients in the 45-degree inclined direction and the 135-degree inclined direction is the minimum second-gradient value of the current pixel in the inclined directions.

The first obtaining unit includes a first obtaining subunit and a second obtaining subunit. The first obtaining subunit is configured to obtain an absolute value of performing subtraction between values of a same color component of the current pixel in one direction, where the one direction is any one direction of the horizontal direction, the vertical direction, the 45-degree inclined direction, and the 135-degree inclined direction; and send the obtained absolute value of performing subtraction between the values of the same color component of the current pixel in the one direction to the second obtaining subunit. The second obtaining subunit is configured to receive the absolute value, which is sent by the first obtaining subunit, of performing subtraction between the values of the same color component of the current pixel in the one direction, perform summation of all absolute values of performing subtraction between the values of the same color component of the current pixel in the one direction, where a result of the summation is the gradient of the current pixel in the one direction, so that the gradients of the current pixel in the horizontal direction, the vertical direction, the 45-degree inclined direction, and the 135-degree inclined direction may be obtained according to this method.

The first obtaining module includes a sorting unit and a first threshold obtaining unit. The sorting unit is configured to separately sort, in a 3×3 window using the current pixel as a center, four green component values and four red component values or four blue component values of pixels adjacent to the current pixel by size, and send a sorting result of the four green component values and four red component values or four blue component values of the pixels adjacent to the current pixel to the first threshold obtaining unit and related units. The first threshold obtaining unit is configured to receive the sorting result sent by the sorting unit, obtain a first weighted average value and a fourth weighted average value or seventh weighted average value of the green component and the red component or blue component, respectively, after the sorting, where the first weighted average value and the fourth weighted average value or seventh weighted average value are the threshold for the green component of the current pixel and the threshold for the red component or blue component of the current pixel, respectively.

The first obtaining module further includes a second threshold obtaining unit. The second threshold obtaining unit is configured to receive the sorting result sent by the sorting unit, and obtain a second weighted average value and a third weighted average value of the green component after the sorting, where the second weighted average value is greater than the third weighted average value, and the second weighted average value and the third weighted average value are a maximum threshold and a minimum threshold of the threshold for the green component of the current pixel, respectively.

The first obtaining module further includes a third threshold obtaining unit and a fourth threshold obtaining unit. The third threshold obtaining unit is configured to receive the sorting result sent by the sorting unit, and when a color component of the current pixel is a blue component, obtain a fifth weighted average value and a sixth weighted average value of the red component after the sorting, where the fifth weighted average value is greater than the sixth weighted average value, and the fifth weighted average value and the sixth weighted average value are a maximum threshold and a minimum threshold of the threshold for the red component of the current pixel, respectively. The fourth threshold obtaining unit is configured to receive the sorting result sent by the sorting unit, and when the color component of the current pixel is a red component, obtain an eighth weighted average value and a ninth weighted average value of the blue component after the sorting, where the eighth weighted average value is greater than the ninth weighted average value, and the eighth weighted average value and the ninth weighted average value are a maximum threshold and a minimum threshold of the threshold for the blue component of the current pixel, respectively.

When the first green component value, the first red component value, or the first blue component value of the current pixel is less than the minimum threshold for the green component, the red component, or the blue component of the current pixel, respectively, the first difference, the second difference, or the third difference is a difference between the first green component value, the first red component value, or the first blue component value of the current pixel and the minimum threshold for the green component, the red component, or the blue component of the current pixel, respectively; when the first green component value, the first red component value, or the first blue component value of the current pixel is greater than the maximum threshold for the green component, the red component, or the blue component of the current pixel, respectively, the first difference, the second difference, or the third difference is a difference between the first green component value, the first red component value, or the first blue component value of the current pixel and the maximum threshold for the green component, the red component, or the blue component of the current pixel, respectively; and when the first green component value, the first red component value, or the first blue component value of the current pixel is greater than or equal to the minimum threshold for the green component, the red component, or the blue component of the current pixel, respectively, and is less than or equal to the maximum threshold for the green component, the red component, or the blue component of the current pixel, respectively, the first difference, the second difference, or the third difference is 0.

According to still another aspect of the present invention, an imaging device is provided and includes a color imaging apparatus, a first obtaining module, a second obtaining module, a third obtaining module, and an output module, where the color imaging apparatus includes a Bayer array, and is configured to obtain one color component of three color components of each pixel of an original image, and send the obtained one color component of the three color components of each pixel of the original image to the first obtaining module; the first obtaining module is configured to receive the one color component, which is sent by the color imaging apparatus, of the three color components of each pixel, and obtain a first result of a current pixel, where the first result of the current pixel includes: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel; and the first obtaining module sends the obtained first result of the current pixel to the second obtaining module and the third obtaining module; the second obtaining module is configured to receive the first result of the current pixel sent by the first obtaining module, and obtain a second result of the current pixel according to the first result of the current pixel, where the second result of the current pixel includes a corrected value of the green component and a corrected value of the red component or blue component of the current pixel; and the second obtaining module sends the obtained second result of the current pixel to the third obtaining module; and the third obtaining module is configured to receive the first result and the second result of the current pixel that are sent by the first obtaining module and the second obtaining module, respectively, and obtain a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel; and the third obtaining module sends the second green component value and the second red component value or second blue component value of the current pixel to the output module; and the output module is configured to receive the second green component value and the second red component value or second blue component value of the current pixel that are sent by the third obtaining module; when the color component of the current pixel is a blue component, output a final color of the current pixel after synthesizing the blue component value, the second green component value, and the second red component value of the current pixel; and when the color component of the current pixel is a red component, output a final color of the current pixel after synthesizing the red component value, the second green component value, and the second blue component value of the current pixel.

In the present invention, a green component value and a red component value or blue component value that are obtained by using an interpolation algorithm are corrected, where gradients of a pixel in different directions, and a threshold for a green component and a threshold for a red component or blue component are comprehensively considered during correction. In the foregoing manner, the green component value and the red component value or blue component value that are obtained by using the interpolation algorithm may be corrected by tactfully using the gradients of the pixel in the different directions, and the threshold for the green component and the threshold for the red component or blue component, thereby reducing crosstalk of a color component in which a current pixel is located on other two color components obtained by interpolation.

DETAILED DESCRIPTION

When a common conventional camera is used, an optical system projects captured light onto a film; then, a person may expose and develop the film by using a chemical process. In a digital camera system, light still passes through an optical system formed by a lens and a lens barrel; a difference lies in that the light is projected onto a plane digital sensor formed by rows and columns. One sensor chip has millions or even tens of millions of pixels. The sensor is a monochromatic electronic element, and can sense light brightness but cannot sense color information. Therefore, before the light is projected onto the sensor chip, the light needs to pass a color filter array (CFA) first, so that light of a corresponding color passes through and light of other colors is filtered out. In order to obtain a full-color image, strength of three color components must be measured at a position of each pixel. However, in order to reduce a cost and volume of a digital camera, a manufacturer normally uses a charge coupled device (CCD) and complementary metal-oxide-semiconductor transistor (CMOS) image sensor, and uses a CFA overlaid on a surface of the image sensor, so that only one color component reaches the position of each pixel.

In a common digital camera, a CFA of a GRGB color palette, that is, a Bayer CFA, is mostly used. Refer to Table 1, where G (Green) represents green, R (Red) represents red, and B (Blue) represents blue.

TABLE 1

| Bayer CFA array | | | | | | | | |
|---|---|---|---|---|---|---|---|---|
| B | G | B | G | B | G | B | G | B |
| G | R | G | R | G | R | G | R | G |
| B | G | B | G | B | G | B | G | B |
| G | R | G | R | G | R | G | R | G |
| B | G | B | G | B | G | B | G | B |
| G | R | G | R | G | R | G | R | G |
| B | G | B | G | B | G | B | G | B |
| G | R | G | R | G | R | G | R | G |
| B | G | B | G | B | G | B | G | B |

As a most classical array, the Bayer CFA is used most widely. The Bayer CFA uses a group of red and green filters and a group of green and blue filters, where a quantity of green components is half of a total quantity of pixels, and quantities of red components and blue components are a quarter of the total quantity of pixels respectively. This is because human's eyes are more sensitive to green and are capable of distinguishing more details; moreover, the green color occupies the most important and widest position in the visible spectrum.

Original output of a sensor made by using the Bayer CFA is a mosaic image having only one color component of red, green, or blue at each pixel; therefore, the mosaic image having only one color component of red, green, or blue at each pixel must be transformed, by using an interpolation algorithm, into a full-color image having three color components of red, green, and blue at each pixel. This process is referred to as interpolation or demosaicing.

The following describes the present invention in detail with reference to accompanying drawings and embodiments.

Figure 1:
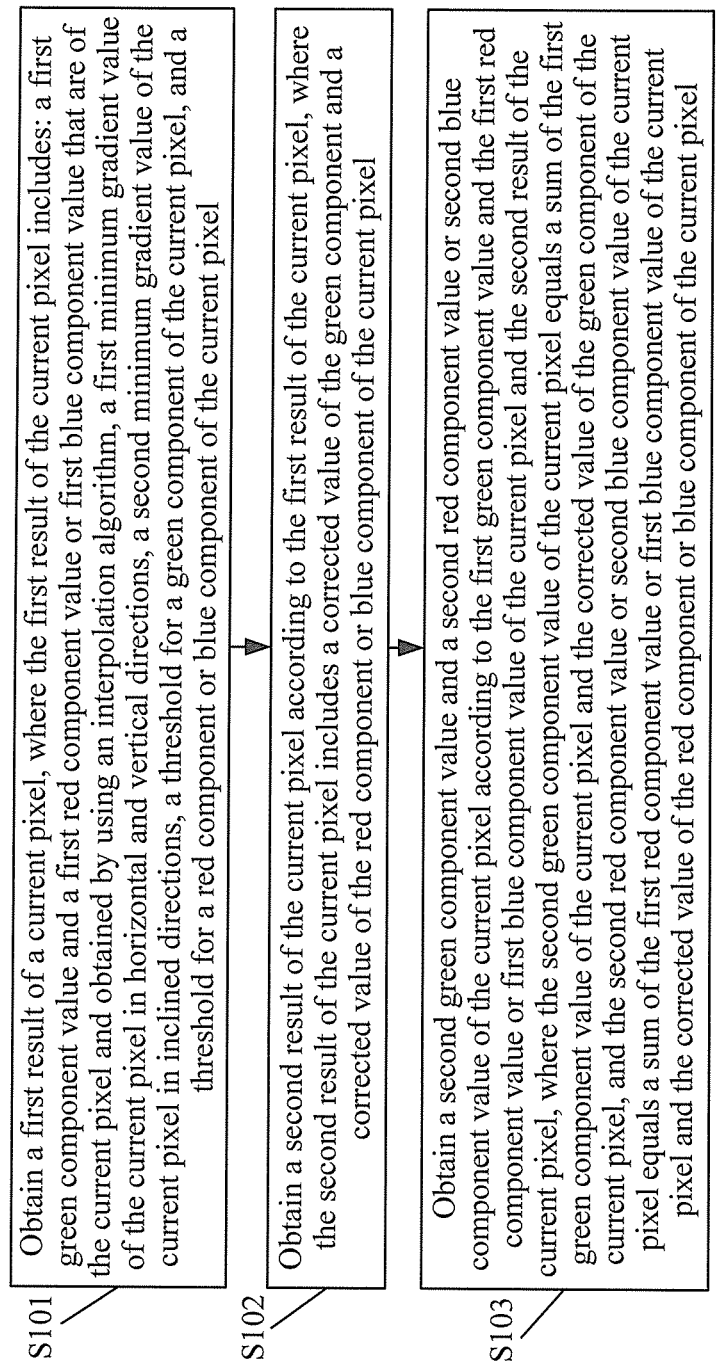
FIG. 1 is a flowchart of an embodiment of an image processing method according to the present invention.
Figure 2A:
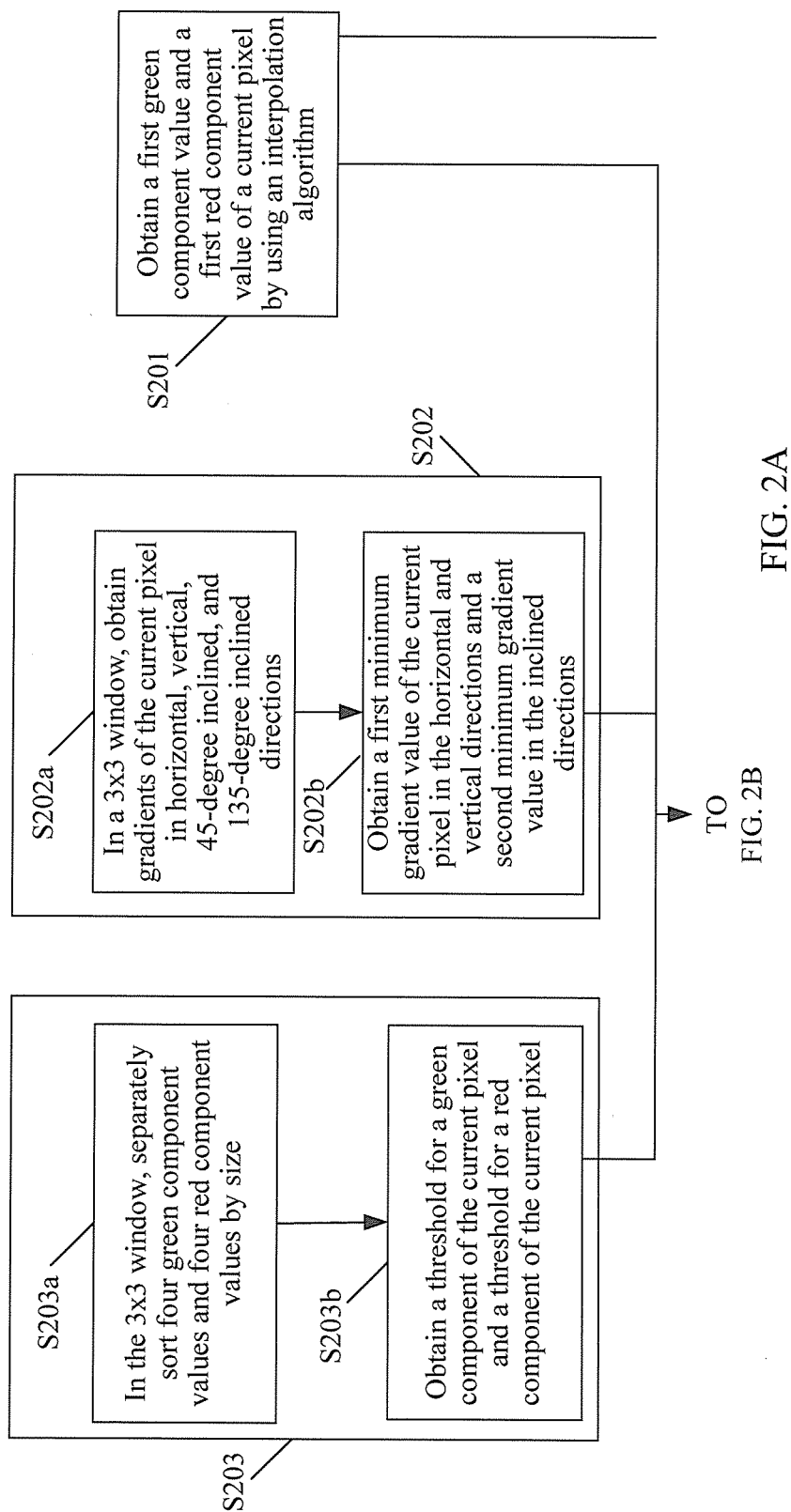
FIG. 2A and FIG. 2B are a flowchart of another embodiment of an image processing method according to the present invention.
Figure 2B:
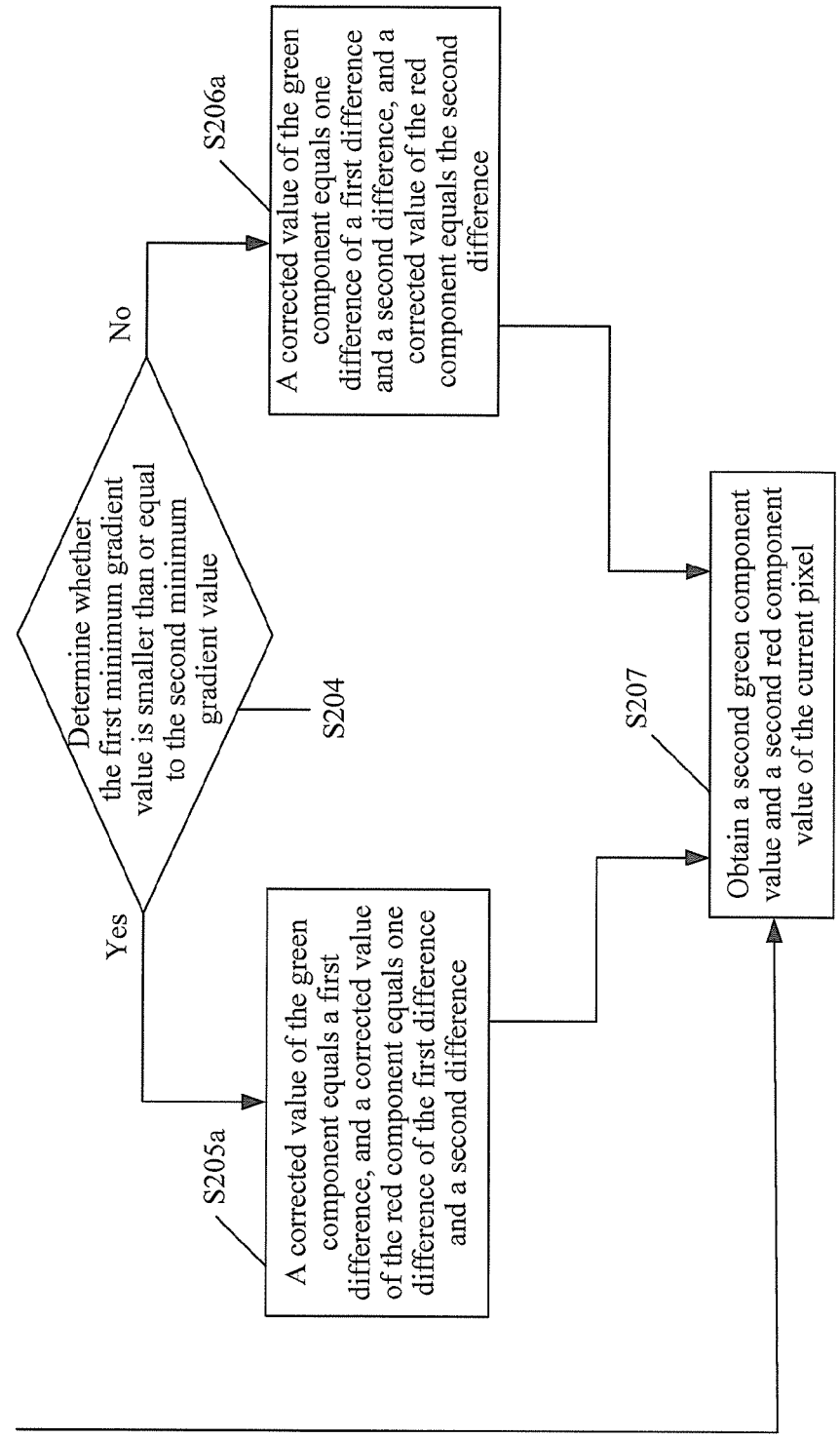
Figure 3A:
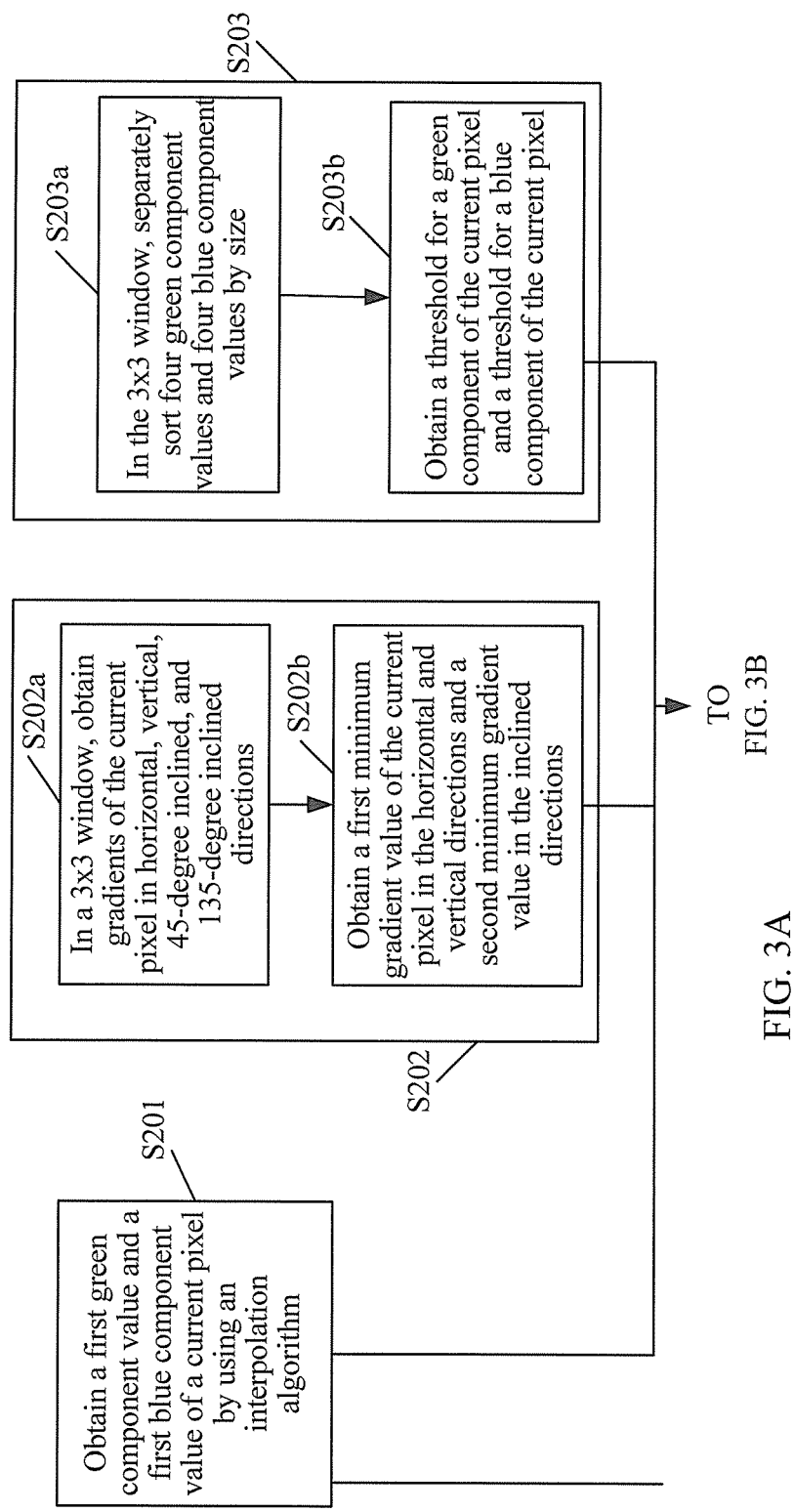
FIG. 3A and FIG. 3B are a flowchart of still another embodiment of an image processing method according to the present invention.
Figure 3B:
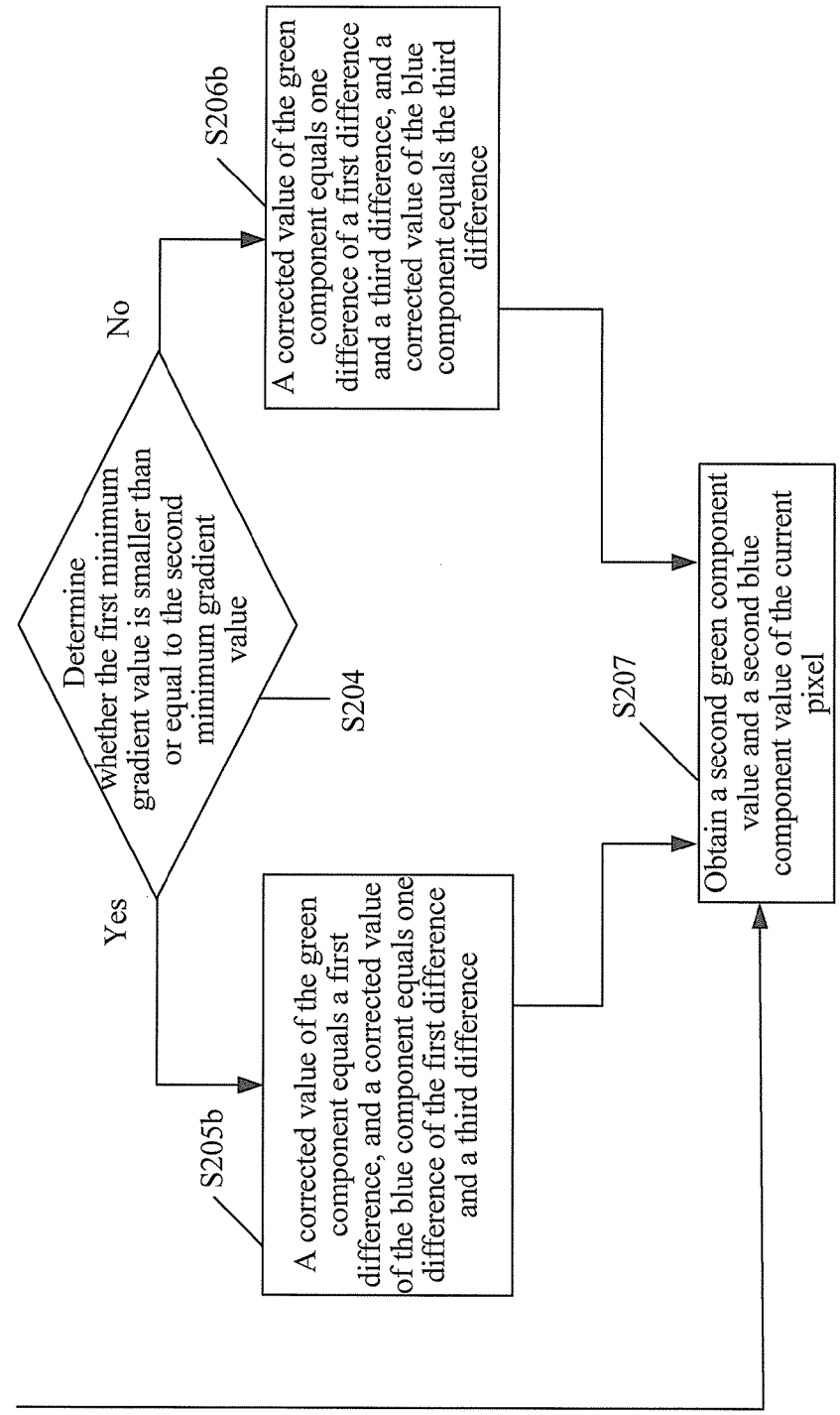

Referring to FIG. 1, FIG. 1 is a flowchart of an embodiment of an image processing method according to the present invention, where the method includes:

Step S101: Obtain a first result of a current pixel, where the first result of the current pixel includes: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel.

When a color component of the current pixel is a blue component, the first green component value and the first red component value of the current pixel are obtained by using an interpolation algorithm; when the color component of the current pixel is a red component, the first green component value and the first blue component value of the current pixel are obtained by using the interpolation algorithm. The interpolation algorithm is not limited in the present invention, and may be, for example, a proximal pixel interpolation algorithm, a bi-linear interpolation algorithm, or a bicubic interpolation algorithm.

A minimum gradient of a gradient in the horizontal direction and a gradient in a vertical direction of the current pixel is the minimum first-gradient value of the current pixel in the horizontal and vertical directions, and a minimum gradient of gradients of the current pixel in two diagonal directions is the minimum second-gradient value of the current pixel in the inclined directions.

An input signal-to-noise ratio at which a threshold effect starts to occur is referred to as a threshold. The so-called threshold effect is a phenomenon in which an output signal-to-noise ratio of a wave detector deteriorates sharply after an input signal-to-noise ratio of the wave detector decreases to a specific value. The current pixel is not independent of adjacent pixels; instead, a correlation exists. By using this correlation, when the color component of the current pixel is a blue component, a threshold for the green component of the current pixel and a threshold for the red component of the current pixel may be obtained; and when the color component of the current pixel is a red component, the threshold for the green component and a threshold for the blue component of the current pixel may be obtained.

Step S102: Obtain a second result of the current pixel according to the first result of the current pixel, where the second result of the current pixel includes a corrected value of the green component and a corrected value of the red component or blue component of the current pixel.

In step S102, when the corrected value of the green component and the corrected value of the red component or blue component of the current pixel are obtained, affecting factors such as the minimum first-gradient value of the current pixel in the horizontal and vertical directions, the minimum second-gradient value of the current pixel in the inclined directions, the threshold for the green component of the current pixel, and the threshold for the red component or blue component of the current pixel are fully considered. For the minimum first-gradient value of the current pixel in the horizontal and vertical directions and the minimum second-gradient value of the current pixel in the inclined directions, a direction in which the current pixel has stronger edge directivity is mainly considered. The threshold for the green component of the current pixel and the threshold for the red component or blue component of the current pixel are used to be compared with the first green component value and the first red component value or first blue component value of the current pixel that are obtained by using the interpolation algorithm, so as to obtain the corrected value of the green component and the corrected value of the red component or blue component of the current pixel.

Step S103: Obtain a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

After the first green component value and the first red component value or first blue component value of the current pixel, and the corrected value of the green component and the corrected value of the red component or blue component of the current pixel are obtained, the second green component value and the second red component value or second blue component value of the current pixel may be obtained. The second green component value and the second red component value or second blue component value of the current pixel are a corrected green component value and a corrected red component value or blue component value of the current pixel, respectively.

In the present invention, a green component value and a red component value or blue component value that are obtained by using an interpolation algorithm are corrected, where gradients of a pixel in different directions, and a threshold for a green component and a threshold for a red component or blue component are comprehensively considered during correction. In the foregoing manner, the green component value and the red component value or blue component value that are obtained by using the interpolation algorithm may be corrected by tactfully using the gradients of the pixel in the different directions, and the threshold for the green component and the threshold for the red component or blue component, thereby reducing crosstalk of a color component in which a current pixel is located on other two color components obtained by interpolation.

Referring to FIG. 2A and FIG. 2B and FIG. 3A and FIG. 3B, FIG. 2A and FIG. 2B and FIG. 3A and FIG. 3B are flowcharts of another two embodiments of an image processing method according to the present invention, where the method includes:

Part 1: Obtain a first result of a current pixel, where the first result of the current pixel includes a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel.

Part 1 includes step S201, step S202, and step S203.

Step S201: Obtain a first green component value and a first red component value or first blue component value of a current pixel by using an interpolation algorithm.

The first green component value and the first red component value or first blue component value of the current pixel are obtained by interpolation by using an interpolation algorithm. If a color component of the current pixel is a blue component, the first green component value and the first red component value of the current pixel are obtained by interpolation; if the color component of the current pixel is a red component, the first green component value and the first blue component value of the current pixel are obtained by interpolation.

Step S202: Obtain a minimum first-gradient value of the current pixel in horizontal and vertical directions and a minimum second-gradient value of the current pixel in inclined directions.

Step S202 includes substep S202a and substep S202b, where specific content is as follows:

Substep S202a: In a 3×3 window using the current pixel as a center, obtain gradients of the current pixel in the horizontal direction, the vertical direction, a 45-degree inclined direction, and a 135-degree inclined direction.

For the 3×3 window using the current pixel as the center, a minimum window using the current pixel as the center and including adjacent pixels is selected, which may simplify a calculation process.

Substep S202a includes the following content:

A. Obtain an absolute value of performing subtraction between values of a same color component of the current pixel in one direction, where the one direction is any one direction of the horizontal direction, the vertical direction, the 45-degree inclined direction, and the 135-degree inclined direction.

For example, referring to Table 2, if the color component of the current pixel is a blue component, an absolute value of performing subtraction between values of a same color component of the current pixel in the horizontal direction is |R11-R13|, |G21-G23|, and |R31-R33|, and an absolute value of performing subtraction between values of a same color component of the current pixel in the vertical direction is |R11-R31|, |G12-G32|, and |R13-R33|; an absolute value of performing subtraction between values of a same color component of the current pixel in the 45-degree inclined direction is |G21-G12|, |R31-R13|, and |G32-G23|; and an absolute value of performing subtraction between values of a same color component of the current pixel in the 135-degree inclined direction is |G12-G23|, |R11-R33|, and |G21-G32|.

TABLE 2

3 × 3 window when the color component
of the current pixel is a blue component

| $R_{11}$ | $G_{12}$ | $R_{13}$ |
| $G_{21}$ | $B_{22}$ | $G_{23}$ |
| $R_{31}$ | $G_{32}$ | $R_{33}$ |

B. Perform summation of all absolute values of performing subtraction between the values of the same color component of the current pixel in one direction, where a result of the summation is the gradient of the current pixel in the one direction, so that the gradients of the current pixel in the horizontal direction, the vertical direction, the 45-degree inclined direction, and the 135-degree inclined direction may be obtained according to this method.

Referring to Table 2, if the color component of the current pixel is a blue component, the gradient of the current pixel in the horizontal direction is |R11-R13|+|G21-G23|+|R31-R33|; the gradient of the current pixel in the vertical direction is |R11-R31|+|G12-G32|+|R13-R33|; the gradient of the current pixel in the 45-degree inclined direction is |G21-G12|+|R31-R13|+|G32-G23|; and the gradient of the current pixel in the 135-degree inclined direction is |G12-G23|+|R11-R33|+|G21-G32|. If the color component of the current pixel is a red component, gradients of the current pixel in the horizontal direction, the vertical direction, the 45-degree inclined direction, and the 135-degree inclined direction may be obtained by using the same method, and details are not repeatedly described herein.

Substep S202b: Obtain a minimum value of the gradients of the current pixel in the horizontal direction and the vertical direction, where the obtained minimum value of the gradients in the horizontal direction and the vertical direction is the minimum first-gradient value of the current pixel in the horizontal and vertical directions; and obtain a minimum value of the gradients of the current pixel in the 45-degree inclined direction and the 135-degree inclined direction, where the obtained minimum value of the gradients in the 45-degree inclined direction and the 135-degree inclined direction is the minimum second-gradient value of the current pixel in the inclined directions.

Referring to Table 2, if the color component of the current pixel is a blue component, the gradient |R11-R13|+|G21-G23|+|R31-R33| of the current pixel in the horizontal direction is compared with the gradient |R11-R31|+|G12-G32|+|R13-R33| of the current pixel in the vertical direction, and if the gradient of the current pixel in the horizontal direction is greater than the gradient of the current pixel in the vertical direction, the minimum first-gradient value of the current pixel in the horizontal and vertical directions is |R11-R31|+|G12-G32|+|R13-R33|; if the gradient of the current pixel in the horizontal direction is less than the gradient of the current pixel in the vertical direction, the minimum first-gradient value of the current pixel in the horizontal and vertical directions is |R11-R13|+|G21-G23|+|R31-R33|; and if the gradient of the current pixel in the horizontal direction is equal to the gradient of the current pixel in the vertical direction, the minimum first-gradient value of the current pixel in the horizontal and vertical directions is |R11-R31|+|G12-G32|+|R13-R33| or |R11-R13|+|G21-G23|+|R31-R33|. The minimum second-gradient value of the current pixel in the inclined directions may be obtained in a similar manner.

According to the foregoing method, if the color component of the current pixel is a red component, the minimum first-gradient value of the current pixel in the horizontal and vertical directions and the minimum second-gradient value of the current pixel in the inclined directions may be obtained.

Step S203: Obtain a threshold for a green component of the current pixel and a threshold for a red component or blue component of the current pixel.

If the color component of the current pixel is a blue component, the threshold for the green component of the current pixel and the threshold for the red component of the current pixel are obtained; if the color component of the current pixel is a red component, the threshold for the green component of the current pixel and the threshold for the blue component of the current pixel are obtained.

Step S203 includes substep S203a and substep S203b, where specific content is as follows:

Substep S203a: In a 3×3 window using the current pixel as a center, separately sort four green component values and four red component values or four blue component values of pixels adjacent to the current pixel by size.

Referring to Table 2, if the color component of the current pixel is a blue component, four green component values G12, G21, G23, and G32 of pixels adjacent to the current pixel are sorted by size, and four red component values R11, R13, R31, and R33 are sorted by size. Otherwise, if the color component of the current pixel is a red component, processing is performed according to the same method.

Substep S203b: Obtain a first weighted average value and a fourth weighted average value or seventh weighted average value of the green component and the red component or blue component, respectively, after the sorting, where the first weighted average value and the fourth weighted average value or seventh weighted average value are the threshold for the green component of the current pixel and the threshold for the red component or blue component of the current pixel, respectively.

Referring to Table 2, if the color component of the current pixel is a blue component, four green component values are multiplied by their respective weights, and then four products are summed, where an obtained result is the first weighted average value of the green component after the sorting, and is also the threshold for the green component of the current pixel, for example, G12×α1+G21×α2+G23×α3+G32×α4, where α1+α2+α3+α4=1. The fourth weighted average value (that is, the threshold for the red component of the current pixel) of the red component after the sorting may be obtained by using the same method. If the color component of the current pixel is a red component, the seventh weighted average value (that is, the threshold for the blue component of the current pixel) of the blue component after the sorting may be obtained in a similar manner.

A sum of four weights of each color component value is 1, and sizes of the four weights of each weighted average value are determined according to actual conditions.

After substep S203a, C, D, and E may be further included, where specific content is as follows:

C: Obtain a second weighted average value and a third weighted average value of the green component after the sorting, where the second weighted average value is greater than the third weighted average value, and the second weighted average value and the third weighted average value are a maximum threshold and a minimum threshold of the threshold for the green component of the current pixel, respectively.

Compared with substep S203b, in C, two thresholds for the green component after the sorting are required, which are the maximum threshold and the minimum threshold respectively. A method used is basically the same as substep S203b, and details are not repeatedly described herein.

The maximum threshold and the minimum threshold may be used to make a corrected value of the green component more accurate.

D: When the color component of the current pixel is a blue component, obtain a fifth weighted average value and a sixth weighted average value of the red component after the sorting, where the fifth weighted average value is greater than the sixth weighted average value, and the fifth weighted average value and the sixth weighted average value are a maximum threshold and a minimum threshold of the threshold for the red component of the current pixel, respectively.

Compared with substep S203b, in D, two thresholds for the red component after the sorting are required, which are the maximum threshold and the minimum threshold respectively. A method used is basically the same as substep S203b, and details are not repeatedly described herein.

E: When the color component of the current pixel is a red component, obtain an eighth weighted average value and a ninth weighted average value of the blue component after the sorting, where the eighth weighted average value is greater than the ninth weighted average value, and the eighth weighted average value and the ninth weighted average value are a maximum threshold and a minimum threshold of the threshold for the blue component of the current pixel, respectively.

Compared with substep S203b, in E, two thresholds for the blue component after the sorting are required, which are the maximum threshold and the minimum threshold, respectively. A method used is basically the same as substep S203b, and details are not repeatedly described herein.

It should be noted that there is no sequence of executing step S201, step S202, and step S203, which may be concurrently executed. If substep S203b is executed, C, D, and E do not need to be executed; if C and D or C and E are executed (that is, one of D and E is selected and executed), substep S203b does not need to be executed.

Part 2: Obtain a second result of the current pixel according to the first result of the current pixel, where the second result of the current pixel includes a corrected value of the green component and a corrected value of the red component or blue component of the current pixel.

Part 2 includes step S204, step S205, and step S206.

Step S204: Determine whether the minimum first-gradient value of the current pixel in the horizontal and vertical directions is less than or equal to the minimum second-gradient value of the current pixel in the inclined directions; if the minimum first-gradient value is less than or equal to the minimum second-gradient value, proceed to step S205; and if the minimum first-gradient value is greater than the minimum second-gradient value, proceed to step S206.

For easy understanding of step S205, step S206, and the following content, it should be noted that a difference between the first green component value of the current pixel and the threshold for the green component of the current pixel is a first difference; when the color component of the current pixel is a blue component, a difference between the first red component value of the current pixel and the threshold for the red component of the current pixel is a second difference; and when the color component of the current pixel is a red component, a difference between the first blue component value of the current pixel and the threshold for the blue component of the current pixel is a third difference.

It should be noted that a manner of determining in step S204 may also be that: determine whether a first gradient of the current pixel in the horizontal and vertical directions is less than or equal to a second gradient of the current pixel in the inclined directions, where the first gradient equals the minimum first-gradient value multiplied by a parameter a, the second gradient equals the minimum second-gradient value multiplied by a parameter b, and the parameters a and b may be in the following several cases:

(1) The parameter a is a reciprocal of an estimated average value corresponding to the minimum first-gradient value, and the parameter b is a reciprocal of an estimated average value corresponding to the minimum second-gradient value.

(2) The parameter a is a constant 1 and the parameter b is a constant 1, which is a case corresponding to step S204.

(3) The parameters a and b are parameters calculated by using a certain same type of algorithm.

Step S205 includes substep S205a or substep S205b, where one of the two substeps is selected and executed, and specific content is as follows:

Substep S205a: If the minimum first-gradient value is less than or equal to the minimum second-gradient value, and when a color component of the current pixel is a blue component, a corrected value of the green component of the current pixel equals the first difference, and a corrected value of the red component of the current pixel equals one of the first difference and the second difference.

If the minimum first-gradient value is less than or equal to the minimum second-gradient value, and when the color component of the current pixel is a blue component, it indicates that in the 3×3 window using the current pixel as the center, the horizontal and vertical directions in which the four green components are located have stronger edge directivity than the inclined directions in which the four red components are located. In this case, the corrected value of the green component of the current pixel equals the first difference (that is, the difference between the first green component value of the current pixel and the threshold for the green component of the current pixel); and the corrected value of the red component of the current pixel equals one of the first difference and the second difference (that is, the difference between the first red component value of the current pixel and the threshold for the red component of the current pixel), that is, one of the first difference and the second difference is selected as the corrected value of the red component of the current pixel.

That the corrected value of the red component of the current pixel equals one of the first difference and the second difference may be that: the corrected value of the red component of the current pixel equals a minimum difference of the first difference and the second difference. That is, a smaller difference of the first difference and the second difference is selected as the corrected value of the red component of the current pixel.

In this manner, the corrected value of the red component of the current pixel may better keep increasing or decreasing smoothly, thereby effectively reducing crosstalk between colors.

Substep S205b: If the minimum first-gradient value is less than or equal to the minimum second-gradient value, and when the color component of the current pixel is a red component, a corrected value of the green component of the current pixel equals the first difference, and a corrected value of the blue component of the current pixel equals one of the first difference and the third difference.

If the minimum first-gradient value is less than or equal to the minimum second-gradient value, and when the color component of the current pixel is a red component, it indicates that in the 3×3 window using the current pixel as the center, the horizontal and vertical directions in which the four green components are located have stronger edge directivity than the inclined directions in which the four blue components are located. In this case, the corrected value of the green component of the current pixel equals the first difference (that is, the difference between the first green component value of the current pixel and the threshold for the green component of the current pixel); and the corrected value of the blue component of the current pixel equals one of the first difference and the third difference (that is, the difference between the first blue component value of the current pixel and the threshold for the blue component of the current pixel), that is, one of the first difference and the third difference is selected as the corrected value of the blue component of the current pixel.

That the corrected value of the blue component of the current pixel equals one of the first difference and the third difference may be that: the corrected value of the blue component of the current pixel equals a minimum difference of the first difference and the third difference. That is, a smaller difference of the first difference and the third difference is selected as the corrected value of the blue component of the current pixel.

In this manner, the corrected value of the blue component of the current pixel may better keep increasing or decreasing smoothly, thereby effectively reducing crosstalk between colors.

Step S206 includes substep S206a or substep S206b, where one of the two substeps is selected and executed, and specific content is as follows:

Substep S206a: If the minimum first-gradient value is greater than the minimum second-gradient value, and when the color component of the current pixel is a blue component, a corrected value of the green component of the current pixel equals one of the first difference and the second difference, and a corrected value of the red component of the current pixel equals the second difference.

If the minimum first-gradient value is greater than the minimum second-gradient value, and when the color component of the current pixel is a blue component, it indicates that in the 3×3 window using the current pixel as the center, the inclined directions in which the four red components are located have stronger edge directivity than the horizontal and vertical directions in which the four green components are located. In this case, the corrected value of the green component of the current pixel equals one of the first difference and the second difference, that is, one difference of the first difference and the second difference is selected as the corrected value of the green component of the current pixel. The corrected value of the red component of the current pixel equals the second difference.

That the corrected value of the green component of the current pixel equals one of the first difference and the second difference may be that: the corrected value of the green component of the current pixel equals a minimum difference of the first difference and the second difference. That is, a smaller difference of the first difference and the second difference is selected as the corrected value of the green component of the current pixel.

In this manner, the corrected value of the green component of the current pixel may better keep increasing or decreasing smoothly, thereby effectively reducing crosstalk between colors.

Substep S206b: If the minimum first-gradient value is greater than the minimum second-gradient value, and when the color component of the current pixel is a red component, a corrected value of the green component of the current pixel equals one of the first difference and the third difference, and a corrected value of the blue component of the current pixel equals the third difference.

If the minimum first-gradient value is greater than the minimum second-gradient value, and when the color component of the current pixel is a red component, it indicates that in the 3×3 window using the current pixel as the center, the inclined directions in which the four blue components are located have stronger edge directivity than the horizontal and vertical directions in which the four green components are located. In this case, the corrected value of the green component of the current pixel equals one of the first difference and the third difference, that is, one difference of the first difference and the third difference is selected as the corrected value of the green component of the current pixel. The corrected value of the blue component of the current pixel equals the third difference.

That the corrected value of the green component of the current pixel equals one of the first difference and the third difference may be that: the corrected value of the green component of the current pixel equals a minimum difference of the first difference and the third difference. That is, a smaller difference of the first difference and the third difference is selected as the corrected value of the green component of the current pixel.

Further, if C is executed in part 1, and when the first green component value of the current pixel is less than the minimum threshold for the green component of the current pixel, the first difference is a difference between the first green component value of the current pixel and the minimum threshold for the green component of the current pixel; when the first green component value of the current pixel is greater than the maximum threshold for the green component of the current pixel, the first difference is a difference between the first green component value of the current pixel and the maximum threshold for the green component of the current pixel; and when the first green component value of the current pixel is greater than or equal to the minimum threshold for the green component of the current pixel, and is less than or equal to the maximum threshold for the green component of the current pixel, the first difference is 0.

In short, if the first green component value of the current pixel is between the minimum threshold and the maximum threshold for the green component of the current pixel, the first difference is 0; if the first green component value of the current pixel is less than the minimum threshold for the green component of the current pixel, the first difference equals the difference between the first green component value of the current pixel and the minimum threshold for the green component of the current pixel, and in this case, the difference is a positive; and if the first green component value of the current pixel is greater than the maximum threshold for the green component of the current pixel, the first difference equals the difference between the first green component value of the current pixel and the maximum threshold for the green component of the current pixel, and in this case, the difference is a negative.

In this manner, the corrected value of the green component of the current pixel may further better keep increasing or decreasing smoothly, thereby effectively reducing crosstalk between colors.

Further, if D is executed in part 1, and when the first red component value of the current pixel is less than the minimum threshold for the red component of the current pixel, the second difference is a difference between the first red component value of the current pixel and the minimum threshold for the red component of the current pixel; when the first red component value of the current pixel is greater than the maximum threshold for the red component of the current pixel, the second difference is a difference between the first red component value of the current pixel and the maximum threshold for the red component of the current pixel; and when the first red component value of the current pixel is greater than or equal to the minimum threshold for the red component of the current pixel, and is less than or equal to the maximum threshold for the red component of the current pixel, the second difference is 0.

In short, if the first red component value of the current pixel is between the minimum threshold and the maximum threshold for the red component of the current pixel, the second difference is 0; if the first red component value of the current pixel is less than the minimum threshold for the red component of the current pixel, the second difference equals the difference between the first red component value of the current pixel and the minimum threshold for the red component of the current pixel, and in this case, the difference is a positive; and if the first red component value of the current pixel is greater than the maximum threshold for the red component of the current pixel, the second difference equals the difference between the first red component value of the current pixel and the maximum threshold for the red component of the current pixel, and in this case, the difference is a negative.

In this manner, the corrected value of the red component of the current pixel may further better keep increasing or decreasing smoothly, thereby effectively reducing crosstalk between colors.

Further, if E is executed in part 1, and when the first blue component value of the current pixel is less than the minimum threshold for the blue component of the current pixel, the third difference is a difference between the first blue component value of the current pixel and the minimum threshold for the blue component of the current pixel; when the first blue component value of the current pixel is greater than the maximum threshold for the blue component of the current pixel, the third difference is a difference between the first blue component value of the current pixel and the maximum threshold for the blue component of the current pixel; and when the first blue component value of the current pixel is greater than or equal to the minimum threshold for the blue component of the current pixel, and is less than or equal to the maximum threshold for the blue component of the current pixel, the third difference is 0.

In short, if the first blue component value of the current pixel is between the minimum threshold and the maximum threshold for the blue component of the current pixel, the third difference is 0; if the first blue component value of the current pixel is less than the minimum threshold for the blue component of the current pixel, the third difference equals the difference between the first blue component value of the current pixel and the minimum threshold for the blue component of the current pixel, and in this case, the difference is a positive; and if the first blue component value of the current pixel is greater than the maximum threshold for the blue component of the current pixel, the third difference equals the difference between the first blue component value of the current pixel and the maximum threshold for the blue component of the current pixel, and in this case, the difference is a negative.

In this manner, the corrected value of the blue component of the current pixel may further better keep increasing or decreasing smoothly, thereby effectively reducing crosstalk between colors.

Content of part 3 is content of step S207, which is specifically as follows:

Step S207: Obtain a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

After the first green component value and the first red component value or first blue component value of the current pixel, and the corrected value of the green component and the corrected value of the red component or blue component of the current pixel are obtained, the second green component value and the second red component value or second blue component value of the current pixel may be obtained. The second green component value and the second red component value or second blue component value of the current pixel are a corrected green component value and a corrected red component value or blue component value of the current pixel, respectively.

In the present invention, a green component value and a red component value or blue component value that are obtained by using an interpolation algorithm are corrected, where gradients of a pixel in different directions, and a threshold for a green component and a threshold for a red component or blue component are comprehensively considered during correction. In the foregoing manner, the green component value and the red component value or blue component value that are obtained by using the interpolation algorithm may be corrected by tactfully using the gradients of the pixel in the different directions, and the threshold for the green component and the threshold for the red component or blue component, thereby reducing crosstalk of a color component in which a current pixel is located on other two color components obtained by interpolation.

In addition, in a 3×3 window using the current pixel as a center, a minimum window using the current pixel as the center and including adjacent pixels is selected, which may simplify a calculation process. The maximum threshold and the minimum threshold may be used to make corrected values of the color components more accurate, which may better keep the corrected values of the color components of the current pixel smoothly increasing or decreasing, and effectively reduce crosstalk between colors.

Figure 4:
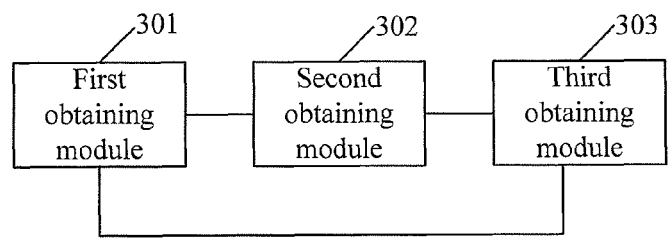
FIG. 4 is a schematic structural diagram of an embodiment of an image processing apparatus according to the present invention.

Referring to FIG. 4, FIG. 4 is a schematic structural diagram of an embodiment of an image processing apparatus according to the present invention. The apparatus includes a first obtaining module 301, a second obtaining module 302, and a third obtaining module 303.

The first obtaining module 301 is configured to obtain a first result of a current pixel, where the first result of the current pixel includes: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel; and the first obtaining module 301 sends the obtained first result of the current pixel to the second obtaining module 302 and the third obtaining module 303.

The first green component value and the first red component value or first blue component value of the current pixel are obtained by using the interpolation algorithm.

A minimum gradient of a gradient in the horizontal direction and a gradient in the vertical direction of the current pixel is the minimum first-gradient value of the current pixel in the horizontal and vertical directions, and a minimum gradient of gradients of the current pixel in two diagonal directions is the minimum second-gradient value of the current pixel in the inclined directions.

The current pixel is not independent of adjacent pixels; instead, a correlation exists. By using this correlation, a threshold for the green component and a threshold for the red component or the blue component of the current pixel may be obtained.

The second obtaining module 302 is configured to receive the first result of the current pixel sent by the first obtaining module 301, and obtain a second result of the current pixel according to the first result of the current pixel, where the second result of the current pixel includes a corrected value of the green component and a corrected value of the red component or blue component of the current pixel; and the second obtaining module 302 sends the obtained second result of the current pixel to the third obtaining module 303.

When the corrected value of the green component and the corrected value of the red component or blue component of the current pixel are obtained, affecting factors such as the minimum first-gradient value of the current pixel in the horizontal and vertical directions, the minimum second-gradient value of the current pixel in the inclined directions, the threshold for the green component of the current pixel, and the threshold for the red component or blue component of the current pixel are fully considered.

The third obtaining module 303 is configured to receive the first result and the second result of the current pixel that are sent respectively by the first obtaining module 301 and the second obtaining module 302, and obtain a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

After the first green component value and the first red component value or first blue component value of the current pixel, and the corrected value of the green component and the corrected value of the red component or blue component of the current pixel are obtained, the second green component value and the second red component value or second blue component value of the current pixel may be obtained. The second green component value and the second red component value or second blue component value of the current pixel are a corrected green component value and a corrected red component value or blue component value of the current pixel, respectively.

In the present invention, a green component value and a red component value or blue component value that are obtained by using an interpolation algorithm are corrected, where gradients of a pixel in different directions, and a threshold for a green component and a threshold for a red component or blue component are comprehensively considered during correction. The foregoing manner may be used to reduce crosstalk of a color component in which a current pixel is located on other two color components obtained by interpolation.

Figure 5:
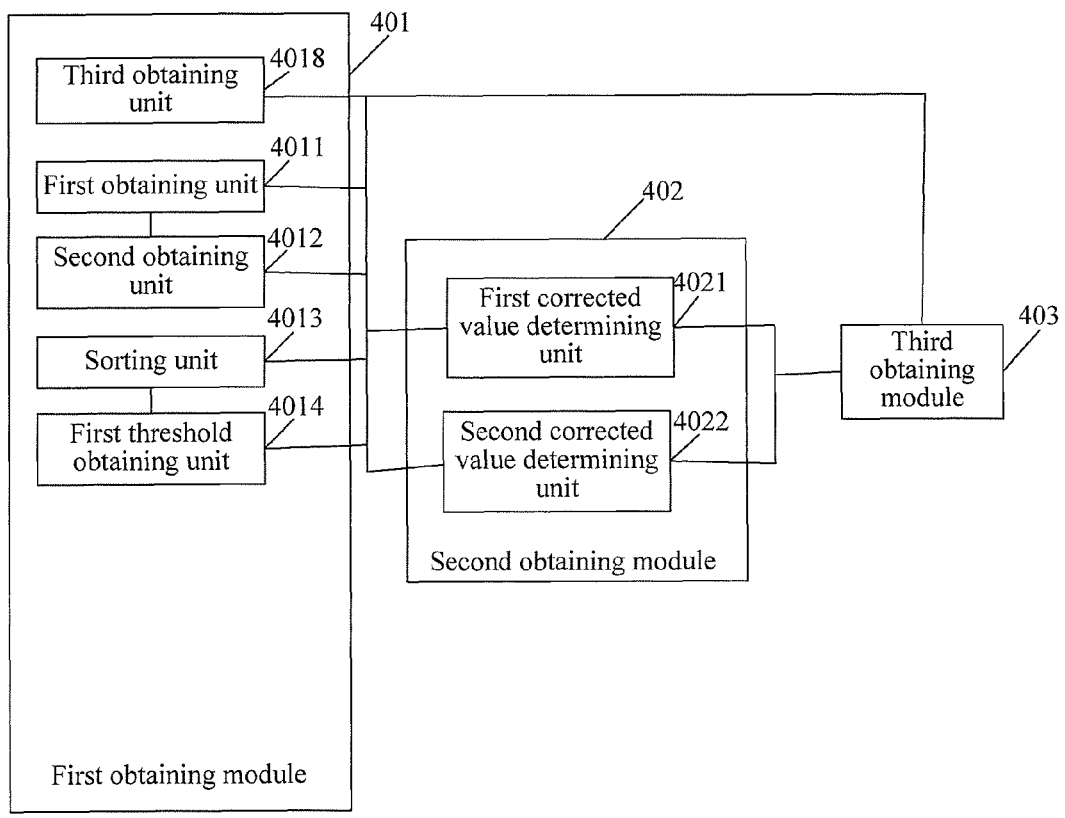
FIG. 5 is a schematic structural diagram of another embodiment of an image processing apparatus according to the present invention.
Figure 6:
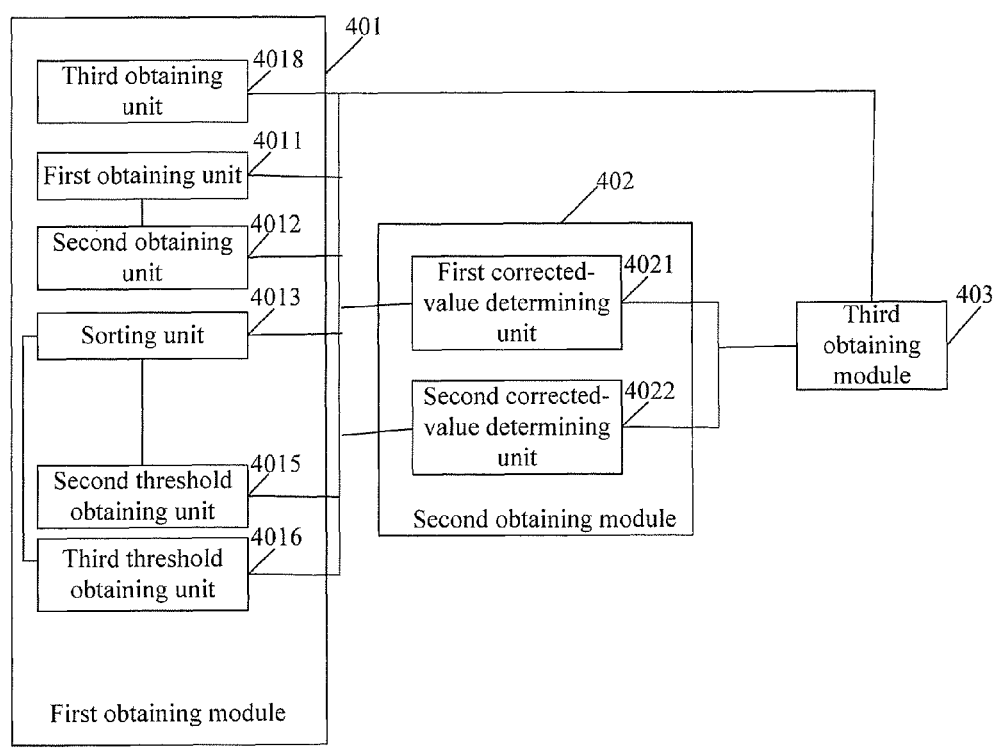
FIG. 6 is a schematic structural diagram of still another embodiment of an image processing apparatus according to the present invention.
Figure 7:
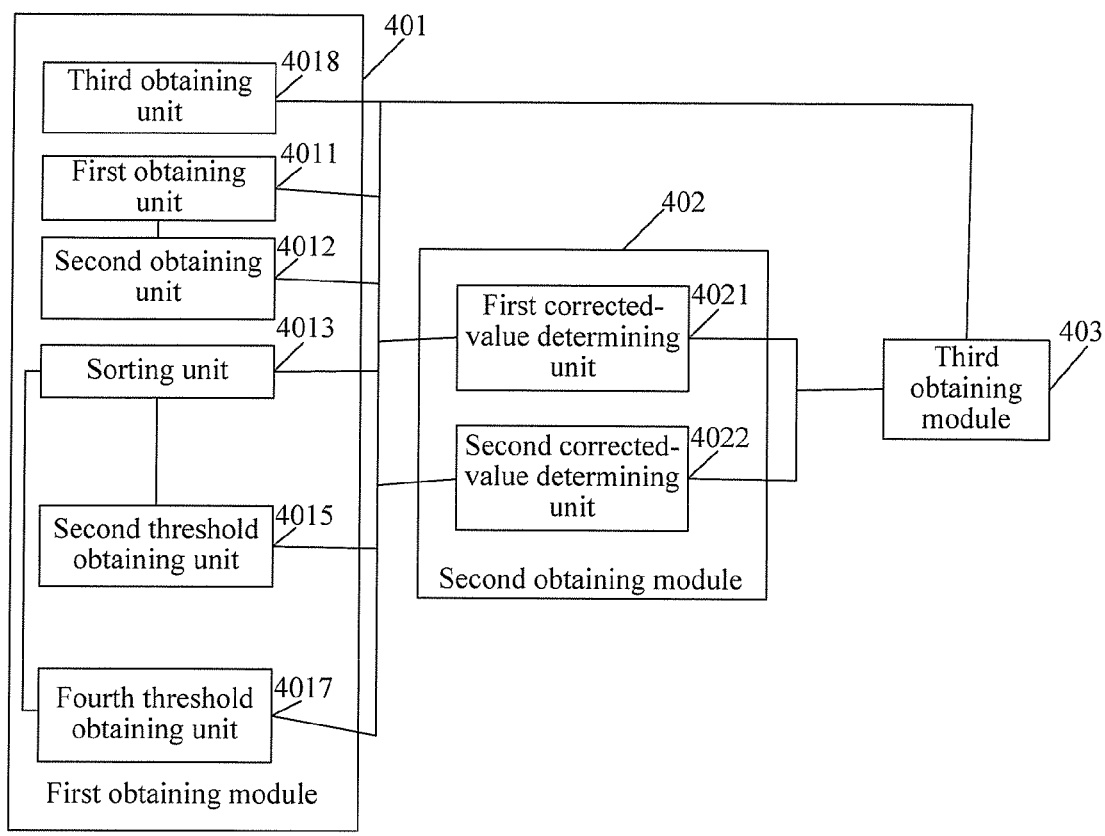
FIG. 7 is a schematic structural diagram of yet another embodiment of an image processing apparatus according to the present invention.

Referring to FIG. 5 to FIG. 7, FIG. 5 to FIG. 7 are schematic structural diagrams of three embodiments of an image processing apparatus according to the present invention. The apparatus includes a first obtaining module 401, a second obtaining module 402, and a third obtaining module 403.

The first obtaining module 401 is configured to obtain a first result of a current pixel, where the first result of the current pixel includes: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel; and the first obtaining module 401 sends the obtained first result of the current pixel to the second obtaining module 402 and the third obtaining module 403.

The first obtaining module 401 includes a first obtaining unit 4011, a second obtaining unit 4012, a third obtaining unit 4018, a sorting unit 4013, and a first threshold obtaining unit 4014.

The first obtaining unit 4011 is configured to, in a 3×3 window using the current pixel as a center, obtain gradients of the current pixel in the horizontal direction, the vertical direction, a 45-degree inclined direction, and a 135-degree inclined direction, and send the gradients of the current pixel in the horizontal direction, the vertical direction, the 45-degree inclined direction, and the 135-degree inclined direction to the second obtaining unit 4012.

The first obtaining unit 4011 includes a first obtaining subunit and a second obtaining subunit.

The first obtaining subunit is configured to obtain an absolute value of performing subtraction between values of a same color component of the current pixel in one direction, where the one direction is any one direction of the horizontal direction, the vertical direction, the 45-degree inclined direction, and the 135-degree inclined direction; and send the obtained absolute value of performing subtraction between the values of the same color component of the current pixel in the one direction to the second obtaining subunit.

The second obtaining subunit is configured to receive the absolute value, which is sent by the first obtaining subunit, of performing subtraction between the values of the same color component of the current pixel in the one direction, perform summation of all absolute values of performing subtraction between the values of the same color component of the current pixel in the one direction, where a result of the summation is the gradient of the current pixel in the one direction, so that the gradients of the current pixel in the horizontal direction, the vertical direction, the 45-degree inclined direction, and the 135-degree inclined direction may be obtained according to this method.

The second obtaining unit 4012 is configured to receive the gradients, which are sent by the first obtaining unit 4011, of the current pixel in the horizontal direction, the vertical direction, the 45-degree inclined direction, and the 135-degree inclined direction; obtain a minimum value of the gradients of the current pixel in the horizontal direction and the vertical direction, where the obtained minimum value of the gradients in the horizontal direction and the vertical direction is the minimum first-gradient value of the current pixel in the horizontal and vertical directions; and obtain a minimum value of the gradients of the current pixel in the 45-degree inclined direction and the 135-degree inclined direction, where the obtained minimum value of the gradients in the 45-degree inclined direction and the 135-degree inclined direction is the minimum second-gradient value of the current pixel in the inclined directions.

The third obtaining unit 4018 is configured to obtain the first green component value and the first red component value or first blue component value of the current pixel by using an interpolation algorithm.

The sorting unit 4013 is configured to separately sort, in a 3×3 window using the current pixel as a center, four green component values and four red component values or four blue component values of pixels adjacent to the current pixel by size, and send a sorting result of the four green component values and four red component values or four blue component values of the pixels adjacent to the current pixel to the first threshold obtaining unit 4014 and related units (the second threshold obtaining unit 4015, the third threshold obtaining unit 4016, and the fourth threshold obtaining unit 4017).

The first threshold obtaining unit 4014 is configured to receive the sorting result sent by the sorting unit 4013, obtain a first weighted average value and a fourth weighted average value or seventh weighted average value of the green component and the red component or blue component, respectively, after the sorting, where the first weighted average value and the fourth weighted average value or seventh weighted average value are the threshold for the green component of the current pixel and the threshold for the red component or blue component of the current pixel, respectively.

The first obtaining module 401 further includes the second threshold obtaining unit 4015, the third threshold obtaining unit 4016, or the fourth threshold obtaining unit 4017.

The second threshold obtaining unit 4015 is configured to receive the sorting result sent by the sorting unit 4013, and obtain a second weighted average value and a third weighted average value of the green component after the sorting, where the second weighted average value is greater than the third weighted average value, and the second weighted average value and the third weighted average value are a maximum threshold and a minimum threshold of the threshold for the green component of the current pixel, respectively.

The third threshold obtaining unit 4016 is configured to receive the sorting result sent by the sorting unit 4013, and when a color component of the current pixel is a blue component, obtain a fifth weighted average value and a sixth weighted average value of the red component after the sorting, where the fifth weighted average value is greater than the sixth weighted average value, and the fifth weighted average value and the sixth weighted average value are a maximum threshold and a minimum threshold of the threshold for the red component of the current pixel, respectively.

The fourth threshold obtaining unit 4017 is configured to receive the sorting result sent by the sorting unit 4013, and when the color component of the current pixel is a red component, obtain an eighth weighted average value and a ninth weighted average value of the blue component after the sorting, where the eighth weighted average value is greater than the ninth weighted average value, and the eighth weighted average value and the ninth weighted average value are a maximum threshold and a minimum threshold of the threshold for the blue component of the current pixel, respectively.

It should be noted that when the first obtaining unit 401 includes the first threshold obtaining unit 4014, the second threshold obtaining unit 4015, the third threshold obtaining unit 4016, or the fourth threshold obtaining unit 4017 is not included; when the first obtaining module 401 includes the second threshold obtaining unit 4015 and the third threshold obtaining unit 4016 or the second threshold obtaining unit 4015 and the fourth threshold obtaining unit 4017, the first threshold obtaining unit 4014 is not included.

The second obtaining module 402 is configured to receive the first result of the current pixel sent by the first obtaining module 401, and obtain a second result of the current pixel according to the first result of the current pixel, where the second result of the current pixel includes a corrected value of the green component and a corrected value of the red component or blue component of the current pixel; and the second obtaining module 402 sends the obtained second result of the current pixel to the third obtaining module 403.

The second obtaining module 402 includes a first corrected-value determining unit 4021 and a second corrected-value determining unit 4022.

It should be noted that a difference between the first green component value of the current pixel and the threshold for the green component of the current pixel is a first difference; when the color component of the current pixel is a blue component, a difference between the first red component value of the current pixel and the threshold for the red component of the current pixel is a second difference; and when the color component of the current pixel is a red component, a difference between the first blue component value of the current pixel and the threshold for the blue component of the current pixel is a third difference.

The first corrected-value determining unit 4021 is configured to receive the first result of the current pixel sent by the first obtaining module 401, where when the minimum first-gradient value is less than or equal to the minimum second-gradient value, the corrected value of the green component of the current pixel equals the first difference; when the color component of the current pixel is a blue component, the corrected value of the red component of the current pixel equals one of the first difference and the second difference, and when the color component of the current pixel is a red component, the corrected value of the blue component of the current pixel equals one of the first difference and the third difference.

The first corrected-value determining unit 4021 is specifically configured to, when the color component of the current pixel is a blue component, enable the corrected value of the red component of the current pixel to equal a minimum difference of the first difference and the second difference, and when the color component of the current pixel is a red component, enable the corrected value of the blue component of the current pixel to equal a minimum difference of the first difference and the third difference.

The second corrected-value determining unit 4022 is configured to receive the first result of the current pixel sent by the first obtaining module 401, where when the minimum first-gradient value is greater than the minimum second-gradient value, and when the color component of the current pixel is a blue component, the corrected value of the green component of the current pixel equals one of the first difference and the second difference, and the corrected value of the red component of the current pixel equals the second difference; and when the color component of the current pixel is a red component, the corrected value of the green component of the current pixel equals one of the first difference and the third difference, and the corrected value of the blue component of the current pixel equals the third difference.

The second corrected-value determining unit 4022 is specifically configured to, when the color component of the current pixel is a blue component, enable the corrected value of the green component of the current pixel to equal a minimum difference of the first difference and the second difference, and when the color component of the current pixel is a red component, enable the corrected value of the green component of the current pixel to equal a minimum difference of the first difference and the third difference.

When the first green component value, the first red component value, or the first blue component value of the current pixel is less than the minimum threshold for the green component, the red component, or the blue component of the current pixel, respectively, the first difference, the second difference, or the third difference is a difference between the first green component value, the first red component value, or the first blue component value of the current pixel and the minimum threshold for the green component, the red component, or the blue component of the current pixel, respectively.

When the first green component value, the first red component value, or the first blue component value of the current pixel is greater than the maximum threshold for the green component, the red component, or the blue component of the current pixel, respectively, the first difference, the second difference, or the third difference is a difference between the first green component value, the first red component value, or the first blue component value of the current pixel and the maximum threshold for the green component, the red component, or the blue component of the current pixel, respectively.

When the first green component value, the first red component value, or the first blue component value of the current pixel is greater than or equal to the minimum threshold for the green component, the red component, or the blue component of the current pixel, respectively, and is less than or equal to the maximum threshold for the green component, the red component, or the blue component of the current pixel, respectively, the first difference, the second difference, or the third difference is 0.

The third obtaining module 403 is configured to receive the first result and the second result of the current pixel that are sent by the first obtaining module and the second obtaining module, respectively, and obtain a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

In the present invention, a green component value and a red component value or blue component value that are obtained by using an interpolation algorithm are corrected, where gradients of a pixel in different directions, and a threshold for a green component and a threshold for a red component or blue component are comprehensively considered during correction. The foregoing manner may be used to reduce crosstalk of a color component in which a current pixel is located on other two color components obtained by interpolation.

Figure 8:
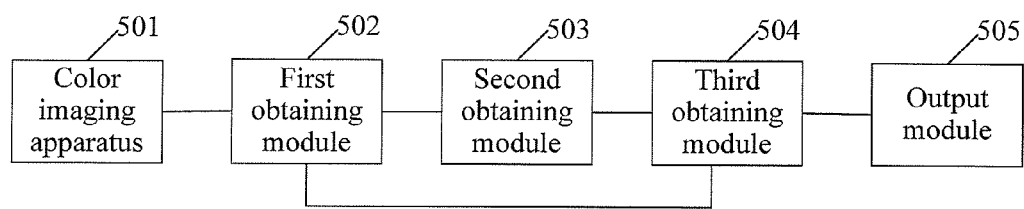
FIG. 8 is a schematic structural diagram of an embodiment of an imaging device according to the present invention.

Referring to FIG. 8, FIG. 8 is a schematic structural diagram of an embodiment of an imaging device according to the present invention. The device includes a color imaging apparatus 501, a first obtaining module 502, a second obtaining module 503, a third obtaining module 504, and an output module 505.

The color imaging apparatus 501 includes a Bayer array, and is configured to obtain one color component of three color components of each pixel of an original image, and send the obtained one color component of the three color components of each pixel of the original image to the first obtaining module 502.

The first obtaining module 502 is configured to receive the one color component, which is sent by the color imaging apparatus 501, of the three color components of each pixel, and obtain a first result of a current pixel, where the first result of the current pixel includes: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel; and the first obtaining module 502 sends the obtained first result of the current pixel to the second obtaining module 503 and the third obtaining module 504.

The second obtaining module 503 is configured to receive the first result of the current pixel sent by the first obtaining module 502, and obtain a second result of the current pixel according to the first result of the current pixel, where the second result of the current pixel includes a corrected value of the green component and a corrected value of the red component or blue component of the current pixel; and the second obtaining module 503 sends the obtained second result of the current pixel to the third obtaining module 504.

The third obtaining module 504 is configured to receive the first result and the second result of the current pixel that are sent respectively by the first obtaining module 502 and the second obtaining module 503, and obtain a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel; and the third obtaining module sends the second green component value and the second red component value or second blue component value of the current pixel to the output module.

The output module 505 is configured to receive the second green component value and the second red component value or second blue component value of the current pixel that are sent by the third obtaining module 504; when the color component of the current pixel is a blue component, output a final color of the current pixel after synthesizing the blue component value, the second green component value, and the second red component value of the current pixel; and when the color component of the current pixel is a red component, output a final color of the current pixel after synthesizing the red component value, the second green component value, and the second blue component value of the current pixel.

In the present invention, a green component value and a red component value or blue component value that are obtained by using an interpolation algorithm are corrected, where gradients of a pixel in different directions, and a threshold for a green component and a threshold for a red component or blue component are comprehensively considered during correction. The foregoing manner may be used to reduce crosstalk of a color component in which a current pixel is located on other two color components obtained by interpolation.

Figure 9:
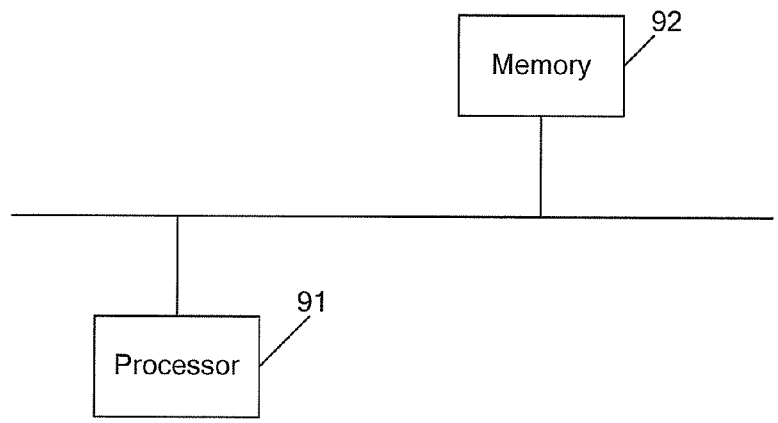
FIG. 9 is a schematic structural diagram of still another embodiment of an image processing apparatus according to the present invention.

Referring to FIG. 9, FIG. 9 is another image processing apparatus provided by the present invention. The apparatus includes a processor 91 and a memory 92.

The processor 91 is configured to obtain a first result of a current pixel, where the first result of the current pixel includes: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel; and store the first result of the current pixel in the memory 92.

The processor 91 is further configured to read the first result of the current pixel stored in the memory 92, and obtain a second result of the current pixel according to the first result of the current pixel, where the second result of the current pixel includes a corrected value of the green component and a corrected value of the red component or blue component of the current pixel; and store the second result of the current pixel in the memory 92.

The processor 91 is further configured to read the first result and the second result of the current pixel that are stored in the memory 92, and obtain a second green component value and a second red component value or second blue component value of the current pixel according to the first green component value and the first red component value or first blue component value of the current pixel and the second result of the current pixel, where the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

In the present invention, a green component value and a red component value or blue component value that are obtained by using an interpolation algorithm are corrected, where gradients of a pixel in different directions, and a threshold for a green component and a threshold for a red component or blue component are comprehensively considered during correction. The foregoing manner may be used to reduce crosstalk of a color component in which a current pixel is located on other two color components obtained by interpolation.

In the several embodiments provided in the present invention, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the purposes of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM, a magnetic disk, or an optical disc.

The foregoing descriptions are merely embodiments of the present invention, and are not intended to limit the scope of the present invention. An equivalent structural or equivalent process alternation made by using the content of the specification and drawings of the present invention, or an application of the content of the specification and drawings directly or indirectly to another related technical field, shall fall within the protection scope of the present invention.

What is claimed is:

1. An image processing method, comprising:
 obtaining a first result of a current pixel, wherein the first result of the current pixel comprises: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel;
 obtaining a second result of the current pixel according to the first result of the current pixel, wherein the second result of the current pixel comprises a corrected value of the green component and a corrected value of the red component or blue component of the current pixel; and
 obtaining a second green component value and a second red component value or second blue component value of the current pixel according to the first green component value and the first red component value or first blue component value of the current pixel and the second result of the current pixel, wherein the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

2. The method according to claim 1, wherein obtaining a second result of the current pixel according to the first result of the current pixel comprises:
   if the minimum first-gradient value is less than or equal to the minimum second-gradient value, the corrected value of the green component of the current pixel equals a first difference, when a color component of the current pixel is a blue component, the corrected value of the red component of the current pixel equals one of the first difference and a second difference, and when the color component of the current pixel is a red component, the corrected value of the blue component of the current pixel equals one of the first difference and a third difference; or
   if the minimum first-gradient value is greater than the minimum second-gradient value, and when a color component of the current pixel is a blue component, the corrected value of the green component of the current pixel equals one of a first difference and a second difference, and the corrected value of the red component of the current pixel equals the second difference, and when the color component of the current pixel is a red component, the corrected value of the green component of the current pixel equals one of the first difference and a third difference, and the corrected value of the blue component of the current pixel equals the third difference; and
   wherein a difference between the first green component value of the current pixel and the threshold for the green component of the current pixel is the first difference, when the color component of the current pixel is a blue component, a difference between the first red component value of the current pixel and the threshold for the red component of the current pixel is the second difference, and when the color component of the current pixel is a red component, a difference between the first blue component value of the current pixel and the threshold for the blue component of the current pixel is the third difference.

3. The method according to claim 2, wherein:
   when the corrected value of the red component of the current pixel equals one of the first difference and a second difference, the corrected value of the red component of the current pixel equals a minimum difference of the first difference and the second difference;
   when the corrected value of the blue component of the current pixel equals one of the first difference and a third difference, the corrected value of the blue component of the current pixel equals a minimum difference of the first difference and the third difference;
   when the corrected value of the green component of the current pixel equals one of a first difference and a second difference, the corrected value of the green component of the current pixel equals a minimum difference of the first difference and the second difference; and
   when the corrected value of the green component of the current pixel equals one of the first difference and a third difference, the corrected value of the green component of the current pixel equals a minimum difference of the first difference and the third difference.

4. The method according to claim 2, wherein:
   when the first green component value, the first red component value, or the first blue component value of the current pixel is less than the minimum threshold for the green component, the red component, or the blue component of the current pixel, respectively, the first difference, the second difference, or the third difference is a difference between the first green component value, the first red component value, or the first blue component value of the current pixel and the minimum threshold for the green component, the red component, or the blue component of the current pixel, respectively;
   when the first green component value, the first red component value, or the first blue component value of the current pixel is greater than the maximum threshold for the green component, the red component, or the blue component of the current pixel, respectively, the first difference, the second difference, or the third difference is a difference between the first green component value, the first red component value, or the first blue component value of the current pixel and the maximum threshold for the green component, the red component, or the blue component of the current pixel, respectively; and
   when the first green component value, the first red component value, or the first blue component value of the current pixel is greater than or equal to the minimum threshold for the green component, the red component, or the blue component of the current pixel, respectively, and is less than or equal to the maximum threshold for the green component, the red component, or the blue component of the current pixel, respectively, the first difference, the second difference, or the third difference is 0.

5. The method according to claim 1, wherein obtaining the minimum first-gradient value of the current pixel in the horizontal and vertical directions and the minimum second-gradient value of the current pixel in the inclined directions comprises:
   in a 3×3 window using the current pixel as a center, obtaining gradients of the current pixel in the horizontal direction, the vertical direction, a 45-degree inclined direction, and a 135-degree inclined direction;
   obtaining a minimum value of the gradients of the current pixel in the horizontal direction and the vertical direction, wherein the obtained minimum value of the gradients in the horizontal direction and the vertical direction is the minimum first-gradient value of the current pixel in the horizontal and vertical directions; and
   obtaining a minimum value of the gradients of the current pixel in the 45-degree inclined direction and the 135-degree inclined direction, wherein the obtained minimum value of the gradients in the 45-degree inclined direction and the 135-degree inclined direction is the minimum second-gradient value of the current pixel in the inclined directions.

6. The method according to claim 5, wherein obtaining gradients of the current pixel in the horizontal direction, the vertical direction, a 45-degree inclined direction, and a 135-degree inclined direction comprises:
   obtaining an absolute value of performing subtraction between values of a same color component of the current pixel in one direction, wherein the one direction is any one direction of the horizontal direction, the vertical direction, the 45-degree inclined direction, and the 135-degree inclined direction; and
   performing summation of all absolute values of performing subtraction between the values of the same color component of the current pixel in one direction, wherein a result of the summation is the gradient of the current pixel in the one direction, so that the gradients of the current pixel in the horizontal direction, the vertical direction, the 45-degree inclined direction, and the 135-degree inclined direction may be obtained according to this method.

7. The method according to claim 1, wherein obtaining the threshold for the green component of the current pixel and the threshold for the red component or blue component of the current pixel comprises:
   in a 3×3 window using the current pixel as a center, separately sorting four green component values and four red component values or four blue component values of pixels adjacent to the current pixel by size; and
   obtaining a first weighted average value and a fourth weighted average value or seventh weighted average value of the green component and the red component or blue component, respectively, after sorting, wherein the first weighted average value and the fourth weighted average value or seventh weighted average value are the threshold for the green component of the current pixel and the threshold for the red component or blue component of the current pixel, respectively.

8. The method according to claim 7, wherein after sorting, in a 3×3 window using the current pixel as a center, four green component values of pixels adjacent to the current pixel by size, the method further comprises:
   obtaining a second weighted average value and a third weighted average value of the green component after sorting, wherein the second weighted average value is greater than the third weighted average value, and the second weighted average value and the third weighted average value are a maximum threshold and a minimum threshold of the threshold for the green component of the current pixel, respectively.

9. The method according to claim 7, wherein after sorting, in a 3×3 window using the current pixel as a center, four red component values or four blue component values of pixels adjacent to the current pixel by size, the method further comprises:
   when a color component of the current pixel is a blue component, obtaining a fifth weighted average value and a sixth weighted average value of the red component after sorting, wherein the fifth weighted average value is greater than the sixth weighted average value, and the fifth weighted average value and the sixth weighted average value are a maximum threshold and a minimum threshold of the threshold for the red component of the current pixel, respectively; and
   when the color component of the current pixel is a red component, obtaining an eighth weighted average value and a ninth weighted average value of the blue component after the sorting, wherein the eighth weighted average value is greater than the ninth weighted average value, and the eighth weighted average value and the ninth weighted average value are a maximum threshold and a minimum threshold of the threshold for the blue component of the current pixel, respectively.

10. An image processing apparatus, comprising:
    a first obtaining module, a second obtaining module, and a third obtaining module;
    wherein the first obtaining module is configured to:
       obtain a first result of a current pixel, wherein the first result of the current pixel comprises: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel, and
       send the obtained first result of the current pixel to the second obtaining module and the third obtaining module;
    wherein the second obtaining module is configured to:
       receive the first result of the current pixel sent by the first obtaining module,
       obtain a second result of the current pixel according to the first result of the current pixel, wherein the second result of the current pixel comprises a corrected value of the green component and a corrected value of the red component or blue component of the current pixel, and
       send the obtained second result of the current pixel to the third obtaining module; and
    wherein the third obtaining module is configured to:
       receive the first result and the second result of the current pixel sent by the first obtaining module and the second obtaining module, respectively, and
       obtain a second green component value and a second red component value or second blue component value of the current pixel according to the first green component value and the first red component value or first blue component value of the current pixel and the second result of the current pixel, wherein the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel.

11. The apparatus according to claim 10, wherein:
    the second obtaining module comprises a first corrected-value determining unit and a second corrected-value determining unit;
    wherein the first corrected-value determining unit is configured to:
       receive the first result of the current pixel sent by the first obtaining module,
       when the minimum first-gradient value is less than or equal to the minimum second-gradient value, the corrected value of the green component of the current pixel equals a first difference,
       when a color component of the current pixel is a blue component, the corrected value of the red component of the current pixel equals one of the first difference and a second difference, and when the color component of the current pixel is a red component, the corrected value of the blue component of the current pixel equals one of the first difference and a third difference; and
    wherein the second corrected-value determining unit is configured to:
       receive the first result of the current pixel sent by the first obtaining module,
       when the minimum first-gradient value is greater than the minimum second-gradient value and when the color component of the current pixel is a blue component, the corrected value of the green component of the current pixel equals one of the first difference and the second difference, and the corrected value of the red component of the current pixel equals the second difference, when the color component of the current pixel is a red component, the corrected value of the green component of the current pixel equals one of the first difference and the third difference, and the corrected value of the blue component of the current pixel equals the third difference, and wherein a difference between the first green component value of the current pixel and the threshold for the green component of the current pixel is the first difference, when the color component of the current pixel is a blue component, a difference between the first red component value of the current pixel and the threshold for the red component of the current pixel is the second difference, and when the color component of the current pixel is a red component, a difference between the first blue component value of the current pixel and the threshold for the blue component of the current pixel is the third difference.

12. The apparatus according to claim 11, wherein:
the first corrected-value determining unit is configured to:
when the color component of the current pixel is a blue component, enable the corrected value of the red component of the current pixel to equal a minimum difference of the first difference and the second difference, and when the color component of the current pixel is a red component, enable the corrected value of the blue component of the current pixel to equal a minimum difference of the first difference and the third difference; and the second corrected-value determining unit is configured to:
when the color component of the current pixel is a blue component, enable the corrected value of the green component of the current pixel to equal a minimum difference of the first difference and the second difference, and when the color component of the current pixel is a red component, enable the corrected value of the green component of the current pixel to equal a minimum difference of the first difference and the third difference.

13. The apparatus according to claim 11, wherein:
when the first green component value, the first red component value, or the first blue component value of the current pixel is less than the minimum threshold for the green component, the red component, or the blue component of the current pixel, respectively, the first difference, the second difference, or the third difference is a difference between the first green component value, the first red component value, or the first blue component value of the current pixel and the minimum threshold for the green component, the red component, or the blue component of the current pixel, respectively;

when the first green component value, the first red component value, or the first blue component value of the current pixel is greater than the maximum threshold for the green component, the red component, or the blue component of the current pixel, respectively, the first difference, the second difference, or the third difference is a difference between the first green component value, the first red component value, or the first blue component value of the current pixel and the maximum threshold for the green component, the red component, or the blue component of the current pixel, respectively; and when the first green component value, the first red component value, or the first blue component value of the current pixel is greater than or equal to the minimum threshold for the green component, the red component, or the blue component of the current pixel, respectively, and is less than or equal to the maximum threshold for the green component, the red component, or the blue component of the current pixel, respectively, the first difference, the second difference, or the third difference is 0.

14. The apparatus according to claim 10, wherein:
the first obtaining module comprises a first obtaining unit and a second obtaining unit;
wherein the first obtaining unit is configured to, in a 3×3 window using the current pixel as a center, obtain gradients of the current pixel in the horizontal direction, the vertical direction, a 45-degree inclined direction, and a 135-degree inclined direction, and send the gradients of the current pixel in the horizontal direction, the vertical direction, the 45-degree inclined direction, and the 135-degree inclined direction to the second obtaining unit; and wherein the second obtaining unit is configured to:
receive the gradients, which are sent by the first obtaining unit, of the current pixel in the horizontal direction, the vertical direction, the 45-degree inclined direction, and the 135-degree inclined direction, obtain a minimum value of the gradients of the current pixel in the horizontal direction and the vertical direction, wherein the obtained minimum value of the gradients in the horizontal direction and the vertical direction is the minimum first-gradient value of the current pixel in the horizontal and vertical directions, and obtain a minimum value of the gradients of the current pixel in the 45-degree inclined direction and the 135-degree inclined direction, wherein the obtained minimum value of the gradients in the 45-degree inclined direction and the 135-degree inclined direction is the minimum second-gradient value of the current pixel in the inclined directions.

15. The apparatus according to claim 14, wherein:
the first obtaining unit comprises a first obtaining subunit and a second obtaining subunit;
wherein the first obtaining subunit is configured to obtain an absolute value of performing subtraction between values of a same color component of the current pixel in one direction, wherein the one direction is any one direction of the horizontal direction, the vertical direction, the 45-degree inclined direction, and the 135-degree inclined direction; and send the obtained absolute value of performing subtraction between the values of the same color component of the current pixel in the one direction to the second obtaining subunit; and wherein the second obtaining subunit is configured to:
receive the absolute value, which is sent by the first obtaining subunit, of performing subtraction between the values of the same color component of the current pixel in the one direction, and perform summation of all absolute values of performing subtraction between the values of the same color component of the current pixel in the one direction, wherein a result of the summation is the gradient of the current pixel in the one direction, so that the gradients of the current pixel in the horizontal direction, the vertical direction, the 45-degree inclined direction, and the 135-degree inclined direction may be obtained according to this method.

16. The apparatus according to claim 10, wherein:
the first obtaining module comprises a sorting unit and a first threshold obtaining unit;
wherein the sorting unit is configured to separately sort, in a 3×3 window using the current pixel as a center, four green component values and four red component values or four blue component values of pixels adjacent to the current pixel by size, and send a sorting result of the four green component values and four red component values or four blue component values of the pixels adjacent to the current pixel to the first threshold obtaining unit and related units; and
wherein the first threshold obtaining unit is configured to:
receive the sorting result sent by the sorting unit, and
obtain a first weighted average value and a fourth weighted average value or seventh weighted average value of the green component and the red component or blue component, respectively, after sorting, wherein the first weighted average value and the fourth weighted average value or seventh weighted average value are the threshold for the green component of the current pixel and the threshold for the red component or blue component of the current pixel, respectively.

17. The apparatus according to claim 16, wherein the first obtaining module further comprises a second threshold obtaining unit configured to:
receive the sorting result sent by the sorting unit; and
obtain a second weighted average value and a third weighted average value of the green component after the sorting, wherein the second weighted average value is greater than the third weighted average value, and the second weighted average value and the third weighted average value are a maximum threshold and a minimum threshold of the threshold for the green component of the current pixel, respectively.

18. The apparatus according to claim 16, wherein:
the first obtaining module further comprises a third threshold obtaining unit and a fourth threshold obtaining unit;
wherein the third threshold obtaining unit is configured to:
receive the sorting result sent by the sorting unit, and
when a color component of the current pixel is a blue component, obtain a fifth weighted average value and a sixth weighted average value of the red component after the sorting, wherein the fifth weighted average value is greater than the sixth weighted average value, and the fifth weighted average value and the sixth weighted average value are a maximum threshold and a minimum threshold of the threshold for the red component of the current pixel, respectively; and
wherein the fourth threshold obtaining unit is configured to:
receive the sorting result sent by the sorting unit, and
when the color component of the current pixel is a red component, obtain an eighth weighted average value and a ninth weighted average value of the blue component after the sorting, wherein the eighth weighted average value is greater than the ninth weighted average value, and the eighth weighted average value and the ninth weighted average value are a maximum threshold and a minimum threshold of the threshold for the blue component of the current pixel, respectively.

19. An imaging device, comprising:
a color imaging apparatus, a first obtaining module, a second obtaining module, a third obtaining module, and an output module;
wherein the color imaging apparatus comprises a Bayer array and is configured to obtain one color component of three color components of each pixel of an original image and send the obtained one color component of the three color components of each pixel of the original image to the first obtaining module;
wherein the first obtaining module is configured to:
receive the one color component, which is sent by the color imaging apparatus, of the three color components of each pixel,
obtain a first result of a current pixel, wherein the first result of the current pixel comprises: a first green component value and a first red component value or first blue component value that are of the current pixel and obtained by using an interpolation algorithm, a minimum first-gradient value of the current pixel in horizontal and vertical directions, a minimum second-gradient value of the current pixel in inclined directions, a threshold for a green component of the current pixel, and a threshold for a red component or blue component of the current pixel, and
send the obtained first result of the current pixel to the second obtaining module and the third obtaining module;
wherein the second obtaining module is configured to:
receive the first result of the current pixel sent by the first obtaining module,
obtain a second result of the current pixel according to the first result of the current pixel, wherein the second result of the current pixel comprises a corrected value of the green component and a corrected value of the red component or blue component of the current pixel, and
send the obtained second result of the current pixel to the third obtaining module;
wherein the third obtaining module is configured to:
receive the first result and the second result of the current pixel that are sent by the first obtaining module and the second obtaining module, respectively,
obtain a second green component value and a second red component value or second blue component value of the current pixel according to the first green component value and the first red component value or first blue component value of the current pixel and the second result of the current pixel, wherein the second green component value of the current pixel equals a sum of the first green component value of the current pixel and the corrected value of the green component of the current pixel, and the second red component value or second blue component value of the current pixel equals a sum of the first red component value or first blue component value of the current pixel and the corrected value of the red component or blue component of the current pixel, and
send the second green component value and the second red component value or second blue component value of the current pixel to the output module; and
wherein the output module is configured to:
receive the second green component value and the second red component value or second blue component value of the current pixel that are sent by the third obtaining module, when the color component of the current pixel is a blue component, output a final color of the current pixel after synthesizing the blue component value, the second green component value, and the second red component value of the current pixel, and when the color component of the current pixel is a red component, output a final color of the current pixel after synthesizing the red component value, the second green component value, and the second blue component value of the current pixel.

* * * * *